United States Patent
Adachi

(10) Patent No.: US 8,736,542 B2
(45) Date of Patent: May 27, 2014

(54) BACKLIGHT AND LIQUID CRYSTAL DISPLAY UNIT USING SAME

(75) Inventor: Takeshi Adachi, Kumagaya (JP)

(73) Assignees: Mitsumi Electric Co., Ltd., Tokyo (JP); ATRC Corporation, Saitama (JP)

( * ) Notice: Subject to any disclaimer, the term of this patent is extended or adjusted under 35 U.S.C. 154(b) by 298 days.

(21) Appl. No.: 12/682,620

(22) PCT Filed: Nov. 7, 2008

(86) PCT No.: PCT/JP2008/070293
§ 371 (c)(1),
(2), (4) Date: Apr. 12, 2010

(87) PCT Pub. No.: WO2009/063803
PCT Pub. Date: May 22, 2009

(65) Prior Publication Data
US 2010/0220047 A1    Sep. 2, 2010

(30) Foreign Application Priority Data

Nov. 13, 2007  (JP) ................................ 2007-294081
Oct. 20, 2008  (JP) ................................ 2008-270220

(51) Int. Cl.
*G09G 3/36*    (2006.01)
(52) U.S. Cl.
USPC .......................................... 345/102; 345/87
(58) Field of Classification Search
USPC ................................................. 345/87, 102
See application file for complete search history.

(56) References Cited

U.S. PATENT DOCUMENTS

| | | | | |
|---|---|---|---|---|
| 7,312,782 B2* | 12/2007 | Hiraki et al. | .................. | 345/102 |
| 7,663,320 B2* | 2/2010 | Kim et al. | ...................... | 315/156 |
| 2004/0030693 A1* | 2/2004 | Toda | ................................. | 707/4 |
| 2005/0184952 A1* | 8/2005 | Konno et al. | ................. | 345/102 |
| 2006/0202945 A1* | 9/2006 | Feng | ............................. | 345/102 |
| 2006/0290627 A1* | 12/2006 | Konno et al. | ................... | 345/87 |
| 2007/0103411 A1* | 5/2007 | Cok et al. | ........................ | 345/82 |
| 2007/0152926 A1* | 7/2007 | Kwon | ............................. | 345/82 |
| 2007/0200121 A1* | 8/2007 | Lankhorst et al. | .............. | 257/79 |
| 2007/0264029 A1* | 11/2007 | Suzuki et al. | ................. | 398/188 |
| 2007/0297172 A1* | 12/2007 | Furukawa et al. | ............ | 362/231 |
| 2008/0112164 A1* | 5/2008 | Teshirogi | ...................... | 362/231 |

FOREIGN PATENT DOCUMENTS

| | | |
|---|---|---|
| JP | 07-191311 | 7/1995 |
| JP | 2002-006815 | 1/2002 |
| JP | 2002-149121 | 5/2002 |
| JP | 2004-191490 | 7/2004 |

(Continued)

OTHER PUBLICATIONS

Japanese Office Action dated Jun. 21, 2011.

(Continued)

*Primary Examiner* — Amare Mengistu
*Assistant Examiner* — Sarvesh J Nadkarni
(74) *Attorney, Agent, or Firm* — IPUSA, PLLC

(57) ABSTRACT

A backlight using multiple light-emitting diodes as a light source and illuminating a liquid crystal display panel from its back, the light-emitting diodes being formed of units, the units each being a minimum unit of m×n (where m and n are natural numbers), includes a driving part configured to drive the light-emitting diodes on a unit-by-unit basis; a block setting part configured to group two or more of the units into a block; and a luminance controlling part configured to control the luminance of the light-emitting diodes of the block independently on a block-by-block basis.

9 Claims, 20 Drawing Sheets

(56) References Cited

FOREIGN PATENT DOCUMENTS

| JP | 2004-240405 | 8/2004 |
|----|-------------|--------|
| JP | 2005-258403 | 9/2005 |
| JP | 2006-133708 | 5/2006 |
| JP | 2006-251796 | 9/2006 |
| JP | 2007-003805 | 1/2007 |
| JP | 2007-086390 | 4/2007 |
| JP | 2008-070558 | 3/2008 |

OTHER PUBLICATIONS

Japanese Office Action mailed Mar. 29, 2011.

* cited by examiner

BACKLIGHT AND LIQUID CRYSTAL DISPLAY UNIT USING SAME

TECHNICAL FIELD

The present invention relates to a backlight using light-emitting diodes that emit light onto the back of a color liquid crystal display panel and to a liquid crystal display unit using the same, and more particularly to a configuration of and a method of driving light-emitting diodes for achieving a high-quality image at low cost.

BACKGROUND ART

Nowadays, mainstream liquid crystal display units display color images by illuminating a transmissive liquid crystal display panel having color filters from its backside with a backlight. Further, conventionally, CCFLs (Cold Cathode Fluorescent Lamps) using fluorescent tubes have often been used in backlights, but usage of mercury has been restricted because of environmental concerns. Accordingly, light-emitting diodes LEDs are taking the place of CCFLs using mercury as a light source. (For example, see Patent Document 1.)

Backlights for liquid crystal panels are roughly divided into two types, edge-lit and direct-lit, depending on the placement of a light source. The edge-lit type, which has a light guide plate provided directly behind the back of a liquid crystal panel and has a light source placed on one side of the light guide plate, is used mainly for relatively small liquid crystal panels for displays for cellular phones and notebook personal computers. Further, the direct-lit type, which has a light source placed directly behind the back of a liquid crystal panel, is better in light use efficiency than the edge-lit type and can be lighter. Accordingly, the direct-lit type is being used for large liquid crystal panels.

Further, direct-lit backlights using light-emitting diodes as a light source include those using white light-emitting diodes as a light source and those using light-emitting diodes that emit light of the three primary colors of red, green, and blue and obtaining white light by mixing the colors.

However, the backlights using light-emitting diodes as configured above, which are constantly turned on when the liquid crystal display unit is in use, in the same manner as the conventional backlights using CCFLs, are desired to further reduce power consumption. Accordingly, it has been proposed, as in Patent Document 2, to reduce power consumption by dividing a backlight into multiple sub units and control luminance on a sub-unit basis.

Further, generally, light-emitting diodes are semiconductor devices that vary greatly in both luminance and chromaticity. Accordingly, it is necessary to screen light-emitting diodes because their random usage impairs image quality because of great variations in luminance and chromaticity. For example, Patent Document 3 has been proposed as a method of economically using light-emitting diodes having variations.

[Patent Document 1] Japanese Laid-Open Patent Application No. 7-191311
[Patent Document 2] Japanese Laid-Open Patent Application No. 2004-191490
[Patent Document 3] Japanese Laid-Open Patent Application No. 2006-133708

DISCLOSURE OF THE INVENTION

Problems to be Solved by the Invention

However, in the case of dividing a backlight into multiple sub units that are independently controllable with respect to luminance and controlling the luminance of display screen areas corresponding to the sub units as in Patent Document 2 described above, the number of light-emitting diodes of the divided sub unit is fixed at, for example, m×n. As a result, it is impossible to change the size of the sub unit, and the display screen areas that are independently controllable with respect to luminance also are fixed. However, it is natural that display screen areas where luminance is desired to be changed differ in size and location. Therefore, when the display screen areas independently controllable with respect to luminance are fixed as in Patent Document 2, there is a problem in that it is difficult to reproduce optimum images.

Further, in the case of using a small number of relatively high-power light-emitting diodes for a backlight, there is a problem in that the effect of a variation in luminance due to the variation of the light-emitting diodes is unignorable, and thus, the need for selecting light-emitting diodes or taking some measures to address the variation in luminance as in Patent Document 3 arises to cause an increase in cost.

Therefore, in view of the above-described points, the present invention has an object of providing a liquid crystal backlight and a liquid crystal display unit using the same, the liquid crystal backlight having multiple light-emitting diodes of low power (approximately 0.1 watts to approximately 0.5 watts) placed as a backlight and grouping neighboring light-emitting diodes into units and enabling independent luminance control on a unit-by-unit basis to make it possible to obtain the luminance of a display screen that matches the contents of a video signal, thereby making it possible to reduce power consumption and obtain optimum images by, for example, darkening the backlight in areas of the display screen that correspond to a dark portion of the video signal.

Means for Solving the Problems

In order to achieve the above-described object, a backlight according to a first aspect of the present invention, using a plurality of light-emitting diodes as a light source and illuminating a liquid crystal display panel from a back thereof, the light-emitting diodes being formed of units, the units each being a minimum unit of m×n (where m and n are natural numbers), includes a driving part configured to drive the light-emitting diodes on a unit-by-unit basis; a block setting part configured to group two or more of the units into a block; and a luminance controlling part configured to control a luminance of the light-emitting diodes of the block independently on a block-by-block basis.

As a result, the unit of driving of the light-emitting diodes can be a minimum unit or a block into which some minimum units are grouped, thus enabling flexible employment of a driving method in accordance with a situation.

Further, as a result of using a large number of low-power light-emitting diodes as a backlight, the number of light-emitting diodes that illuminates a certain area of a display screen is relatively large compared with the case of using a small number of high-power light-emitting diodes. As a result, there is the advantage that variations in the luminance of the light-emitting diodes are averaged so that it is possible to reduce the effect of the luminance variation of the light-emitting diodes.

According to a second aspect of the present invention, in the backlight according to the first aspect, the block setting part includes a switching part configured to change a size of the block into which the two or more of the units are grouped to any setting, the units each being the minimum unit of the light-emitting diodes.

As a result, it is possible to change a block setting as desired by switch switching, so that driving of the light-emitting diodes can be controlled simply in units of suitable blocks in accordance with situations.

According to a third aspect of the present invention, in the backlight according to the second aspect, the block setting part is configured to set the size of the block based on a content of a video signal.

As a result, it is possible to obtain the luminance of a display screen that matches the contents of a video signal. For example, it is possible to reduce power consumption and to obtain an optimum image by darkening backlighting for an area of the display screen corresponding to a dark portion of the video signal According to a fourth aspect of the present invention, the backlight according to the third aspect further includes a luminance detecting part configured to detect a luminance of the video signal, wherein the block setting part is configured to set the size of the block based on the luminance of the video signal detected by the luminance detecting part, and the luminance controlling part is configured to control the luminance of the light-emitting diodes on the block-by-block basis.

As a result, it is possible to set the size of a block in accordance with the luminance of a video signal. For example, in the case of a video signal including a portion where a low-luminance region is present in mass, the block is set to a suitable size for the region, and the luminance of the region due to the backlight is reduced. Thereby, it is possible to save power.

According to a fifth aspect of the present invention, in the backlight according the fourth aspect, the light-emitting diodes include a white light-emitting diode, a red light-emitting diode, a green light-emitting diode, and/or a blue light-emitting diode.

As a result, it is possible to perform luminance control and color temperature control with ease, and to configure the light source of the backlight by combining appropriate light-emitting diodes.

A liquid crystal display unit according to a sixth aspect of the present invention includes the backlight according to the first aspect; a liquid crystal display panel placed to face a front of the backlight and configured to display an image by being illuminated from a back thereof by the backlight; a source driver and a gate driver configured to drive the liquid crystal display panel; and a liquid crystal panel control circuit configured to control driving of the source driver and the gate driver.

As a result, it is possible to display a high-definition image on a liquid crystal display panel while reducing power consumption.

Effects of the Invention

According to the present invention, it is possible to reduce power consumption by, for example, reducing the luminance of a backlight corresponding to a dark area of a display screen in accordance with the contents of a video signal. Further, since it is possible to reduce variations in luminance, it is possible to lower the prices of backlights. Accordingly, a practical effect on large liquid crystal televisions and monitors in particular is significant.

BRIEF DESCRIPTION OF THE DRAWINGS

FIG. 17 is a diagram illustrating units including the light-emitting diodes 16 arranged adjacently on a backlight board 180a.

Figure 1:
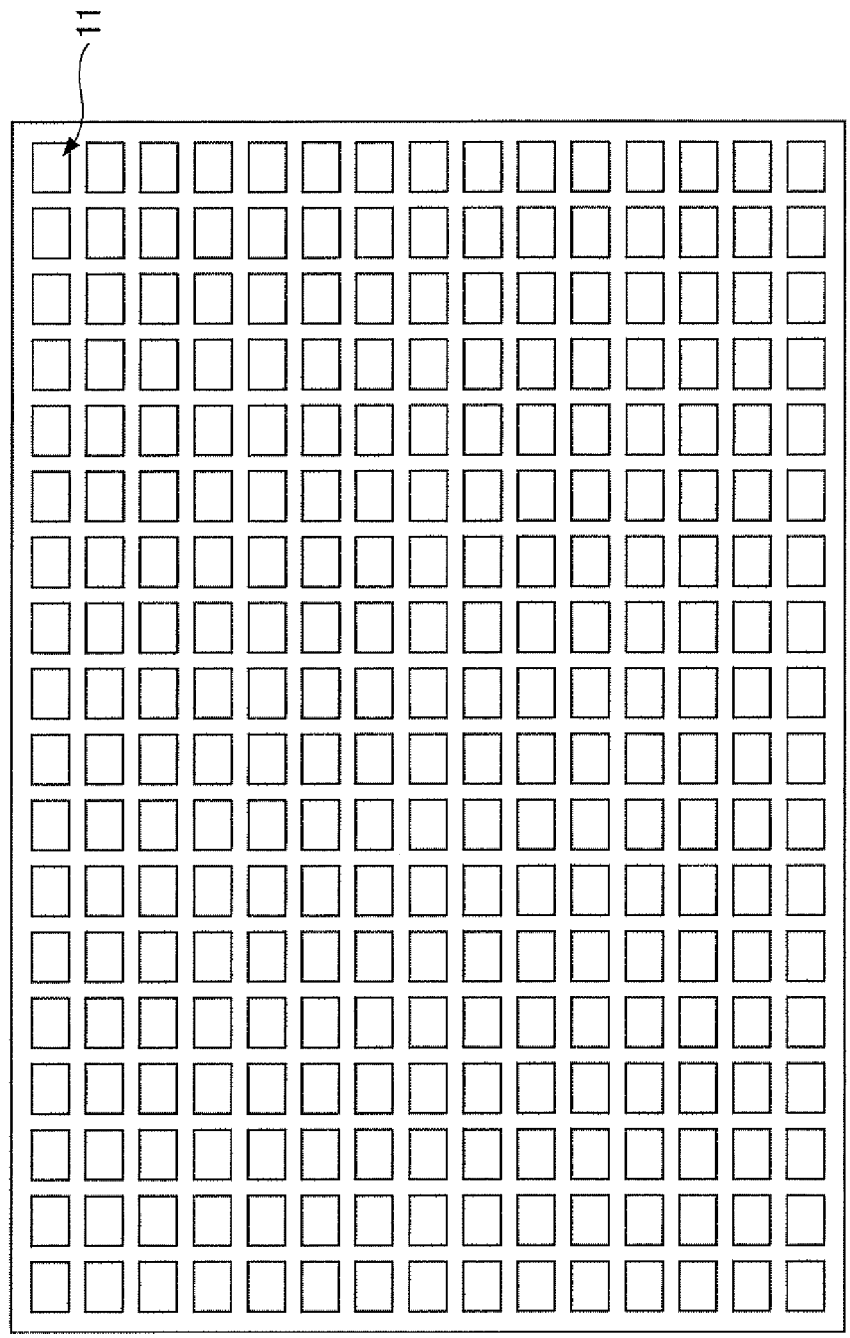
FIG. 1 is a diagram illustrating an array of light-emitting diodes in a backlight according to the present invention.

DESCRIPTION OF THE REFERENCE NUMERALS 11, 12, 13, 14, 15, 16, 51 light-emitting diode
31, 41, 42 block of divided region
71, 72, 73, 74 division of backlight
91, 101, 111, 113, 121, 131, 171 horizontal driver circuit (X driver)
92, 102, 112, 114, 122, 132, 172 vertical driver circuit (Y driver)
123, 133, 175 ring counter
124, 134, 176 drive amplifier
125, 177 D flip-flop
126, 178, 179 NOR gate
140 luminance detecting means
150 block setting means
160 luminance controlling means
170, 170a driving means
173 X driver unit
174 Y driver unit
180 backlight board
200 backlight
210 video signal processing circuit
220 memory
230 liquid crystal panel control circuit
240 source driver
250 gate driver
260 liquid crystal panel
300 liquid crystal display unit

BEST MODE FOR CARRYING OUT THE INVENTION

A description is given below, with reference to the drawings, of a best mode for carrying out the present invention.

Figure 2:
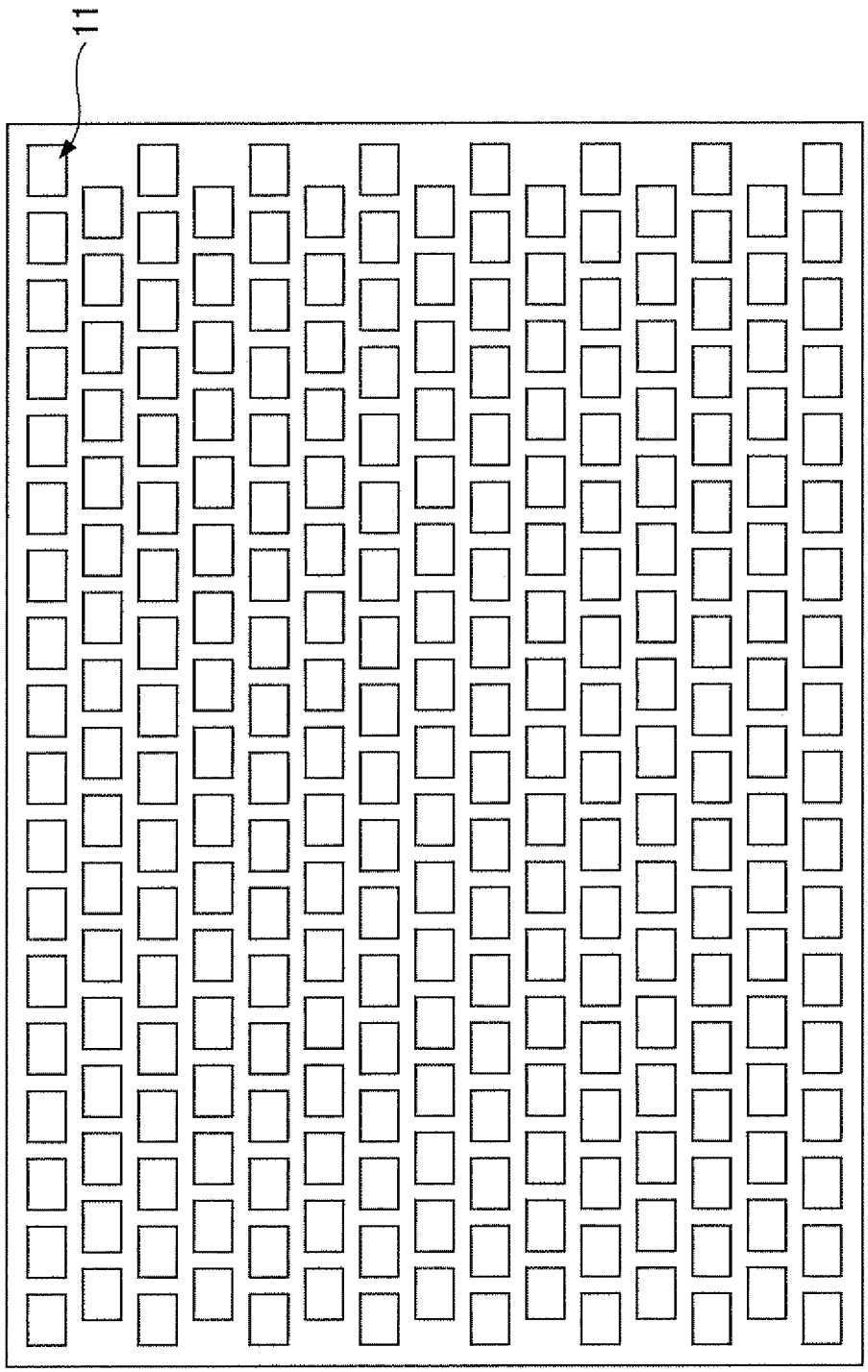
FIG. 2 is a diagram illustrating another array of light-emitting diodes in the backlight according to the present invention.

As an example of the best mode for carrying out the present invention, a description is given of the case of using white light-emitting diodes as the light source of a backlight. FIG. 1 is a diagram illustrating an array of light-emitting diodes in the case of defining a single (1×1) white light-emitting diode 11 as a unit, which is a minimum unit. In a backlight according to this embodiment, for example, the white light-emitting diodes 11 of relatively small power are placed substantially evenly over the entire surface of the backlight as in FIG. 1. Further, FIG. 2 illustrates another array of light-emitting diodes. The present invention is not limited to the arrays of light-emitting diodes illustrated in FIG. 1 and FIG. 2.

Figure 3:
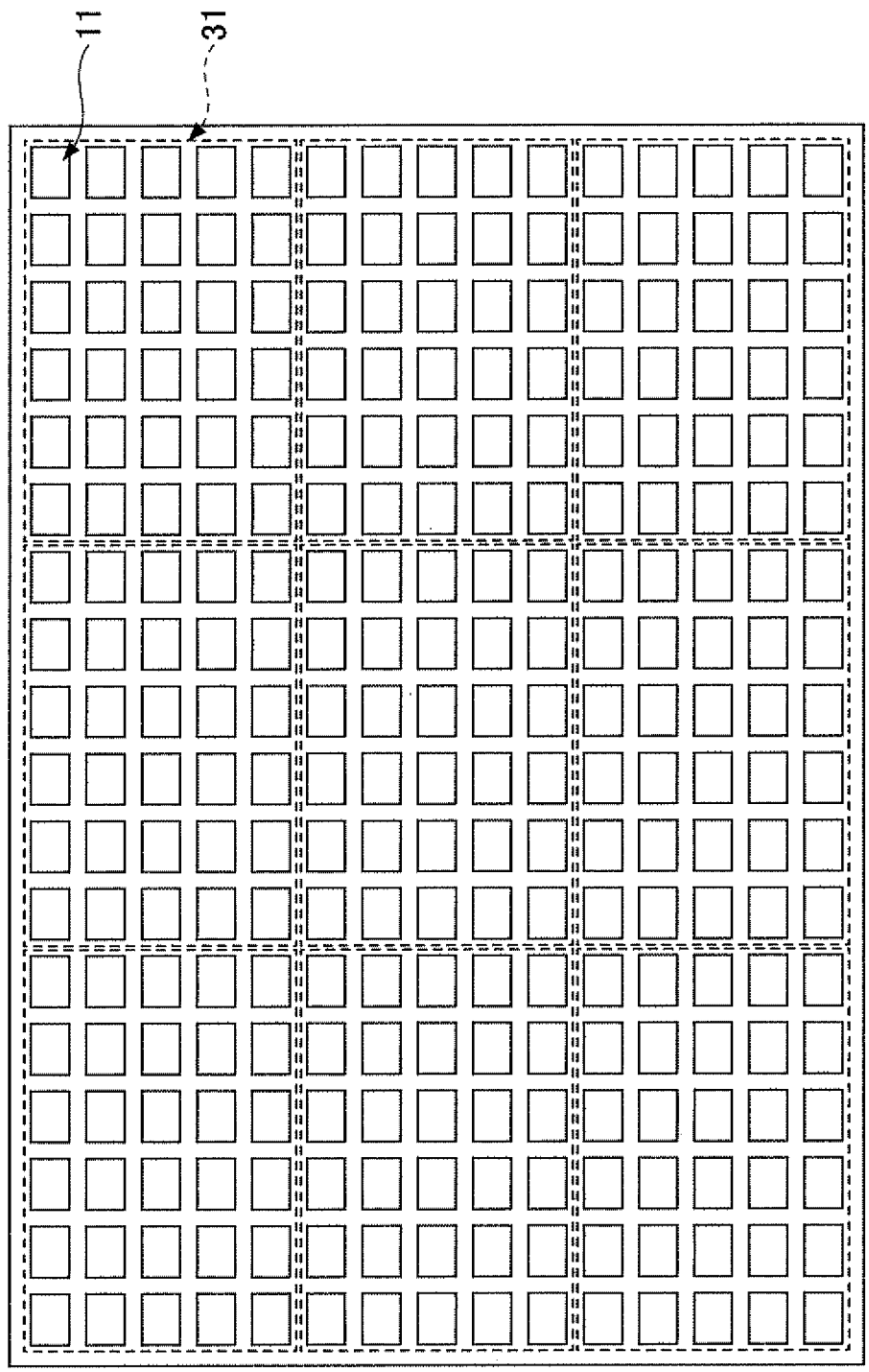
FIG. 3 is a diagram for describing block division of the backlight according to the present invention.
Figure 4:
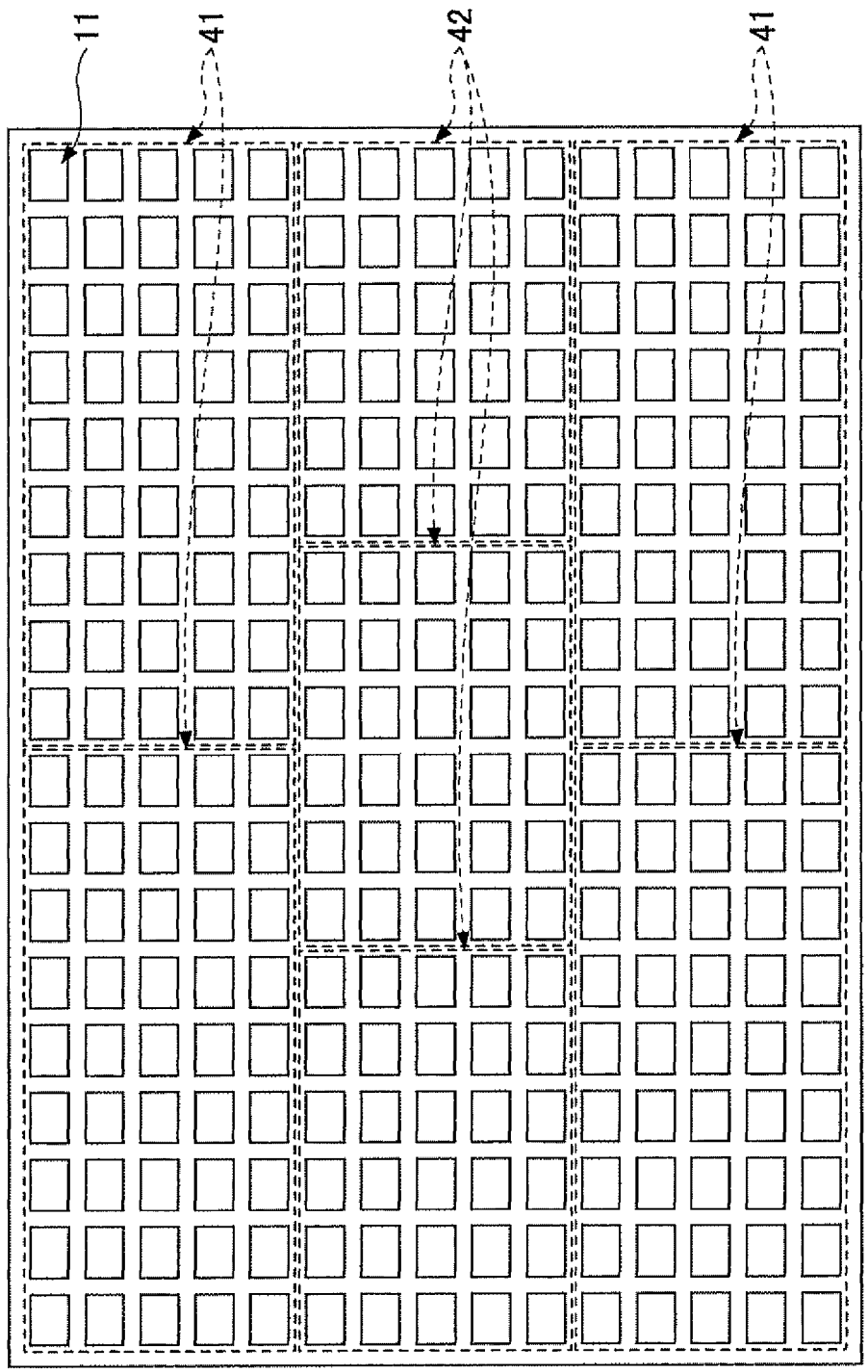
FIG. 4 is a diagram for describing another block division of the backlight according to the present invention.

Next, a description is given of the case of grouping multiple units, which are the smallest units of light-emitting diodes, into a block. FIG. 3 is a diagram illustrating the case of defining 6×5 units of light-emitting diodes 11 as a single block 31 and dividing the backlight into 3×3=9 blocks. If the luminance of a video signal does not differ greatly in the same block of FIG. 3 and differs between blocks, the entire backlight is divided into the blocks 31 as in FIG. 3 and the brightness of each block is controlled in accordance with the luminance of the video signal. That is, such control is performed that the luminance of the backlight increases for blocks 31 of high luminance and decreases for blocks 31 of low luminance. FIG. 4 is a diagram illustrating another example of block division. FIG. 4 illustrates the case of dividing the upper portion and the lower portion of the display screen into two blocks 41 each while dividing the center portion into three blocks 42. Thus, the entire backlight is divided into the blocks 31, 41, and 42 in accordance with the contents of a video signal, for example, the luminance of the video signal, and the luminance of light-emitting diodes is controlled on a divided block basis to decrease the luminance of the backlight where the video signal is dark. Accordingly, it is possible to reduce the power consumption of the backlight.

Further, according to the present invention, when the backlight is divided into blocks and the luminance differs between divided blocks as described above, it is also possible to reduce changes in luminance caused at their boundaries to make the changes less noticeable. For example, it is assumed that one of the blocks 31, 41, or 42 is bright and an adjacent one of the blocks 31, 41, or 42 is dark. In this case, the luminance of those of the white light-emitting diodes 11 near the boundary of the bright one of the blocks 31, 41, or 42 is gradually reduced while those of the white light-emitting diodes 11 near the boundary of the dark one of the blocks 31, 41, or 42 is gradually brightened. This is made possible by the white light-emitting diodes 11 of low power arranged in a multitude.

Figure 5:
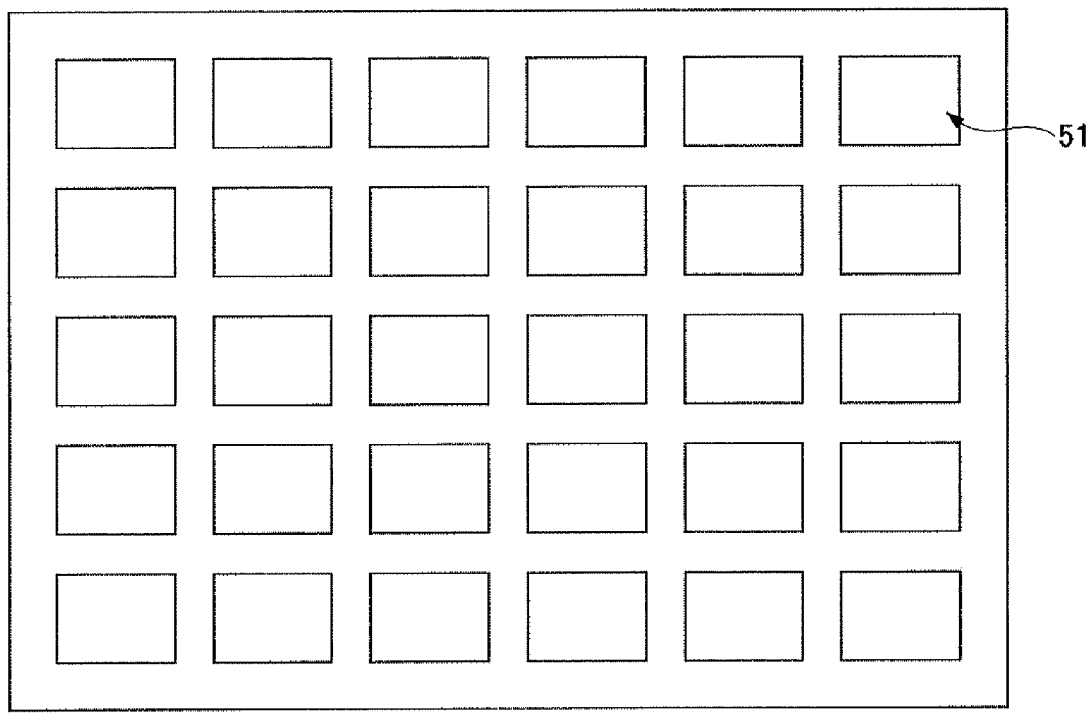
FIG. 5 is a diagram for describing the case of using conventional relatively high-power light-emitting diodes.

FIG. 5 is a diagram illustrating a backlight using a small number of light-emitting diodes 51 of high power as a comparative example for reference. According to the present invention, the white light-emitting diodes 11 of low power are used in multitude as a light source for backlighting as in FIG. 1. Therefore, compared with the backlight using the small number of light-emitting diodes 51 of high power as in FIG. 5, the number of the light-emitting diodes 11 in a display screen is large. Accordingly, variations in the luminance of the individual light-emitting diodes 11 are averaged, thus making it possible to reduce the effect of luminance variations.

Figure 6:
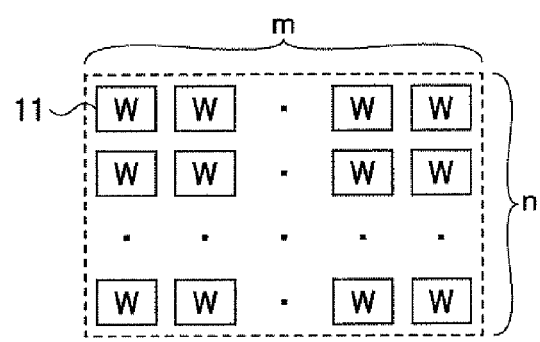
FIG. 6 is a diagram for describing a configuration of a unit, which is a minimum unit, in the backlight according to the present invention.

FIG. 6 is a diagram illustrating a case where the unit, which is the minimum unit of the white light-emitting diodes 11 for backlighting, is formed of multiple light-emitting diodes. A description has been given so far of the case where the unit, which is a minimum unit of light-emitting diodes for backlighting, is formed of 1×1=1 white light-emitting diode 11. Alternatively, the unit may also include multiple light-emitting diodes of m×n (m and n are natural numbers) as illustrated in FIG. 6. In this case, multiple units are grouped into a block as desired using the unit of m×n as a minimum unit. That is, blocking according to the contents of a video signal may be performed to independently control the entire luminance of the light-emitting diodes 11 included in each block.

Figure 7:
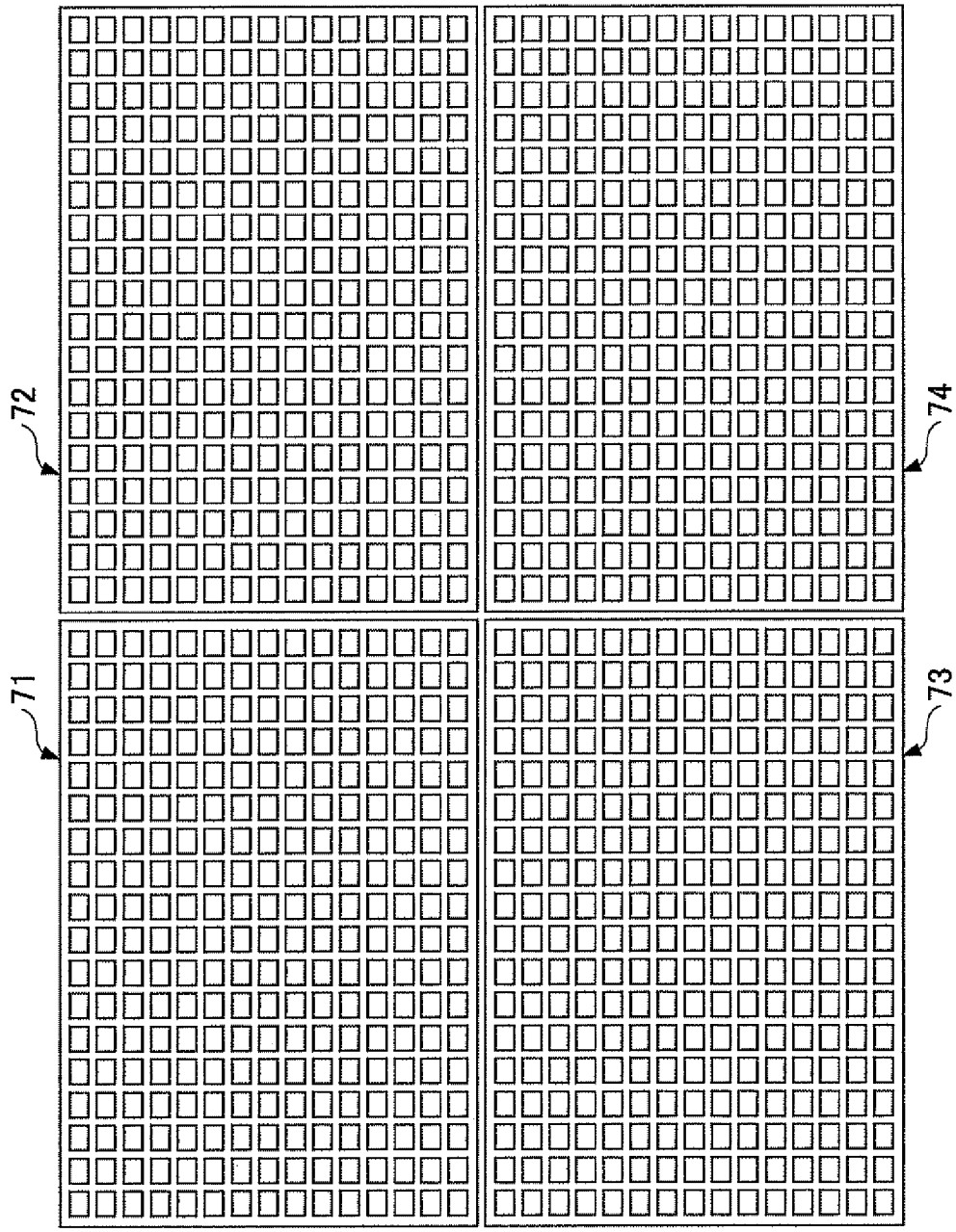
FIG. 7 is a diagram describing the case of dividing the backlight into multiple pieces in the backlight according to the present invention.

According to another embodiment of the present invention, the backlight may be configured by multiple pieces as illustrated in FIG. 7. FIG. 7 illustrates a case where the backlight is configured by four pieces (71, 72, 73, and 74). By thus dividing the backlight into multiple pieces, the numbers of light-emitting diodes and interconnects in a divided backlight board are reduced. Accordingly, a circuit controlling the brightness of the single backlight board is simplified. Whether the backlight is to be divided or how many pieces the backlight is to be divided into may be determined based on the size of a liquid crystal panel, the number of light-emitting diodes, and a control circuit for light-emitting diodes.

A description has been given so far, taking the white light-emitting diodes 11 as an example. Alternatively, color light-emitting diodes 15 may also be used as illustrated in FIG. 8A through FIG. 8D.

Figure 8A:
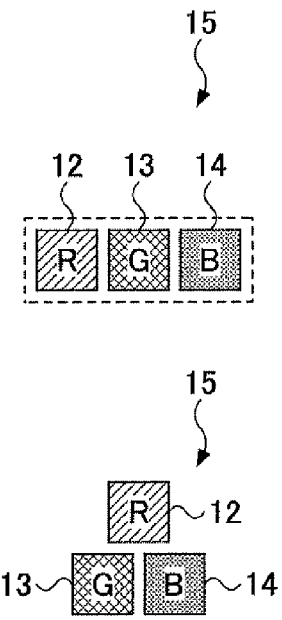
FIG. 8A is a diagram illustrating an arrangement of light-emitting diodes 16 including color light-emitting diodes 15.

FIG. 8A is a diagram illustrating an arrangement of light-emitting diodes 16 including the color light-emitting diodes 15. FIG. 8A illustrates a case where a single red (R) light-emitting diode 12, a single green (G) light-emitting diode 13, and a single blue (B) light-emitting diode 14 make a set as the color light-emitting diodes 15. Hereinafter, the light-emitting diodes of the red light-emitting diode 12, the green light-emitting diode 13, and the blue light-emitting diode 14 are collectively referred to as color light-emitting diodes 15, and further referred to as light-emitting diodes 16 in the case of including the white light-emitting diodes 11 or in the case of not specifying the color of the emitted light of the light-emitting diode. In FIG. 8A, the upper drawing illustrates the case of an in-line array, and the lower drawing illustrates the case of a delta array.

Figure 8B:
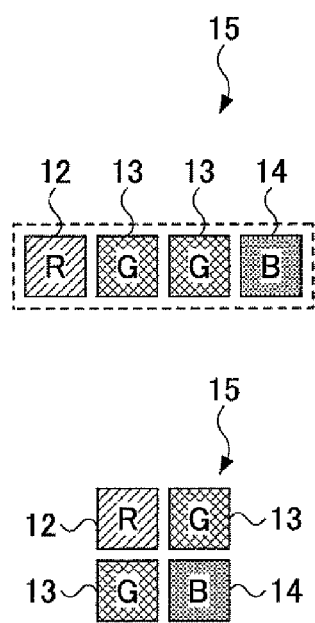
FIG. 8B is a diagram illustrating an arrangement of the light-emitting diodes 16 including the color light-emitting diodes 15, different from FIG. 8A.

FIG. 8B is a diagram illustrating an arrangement of the light-emitting diodes 16 including the color light-emitting diodes 15, different from FIG. 8A. FIG. 8B illustrates a case where the color light-emitting diodes 15 include the single red (R) light-emitting diode 12, the single blue (B) diode 14, and the two green (G) light-emitting diodes 13 as a set.

Figure 8C:
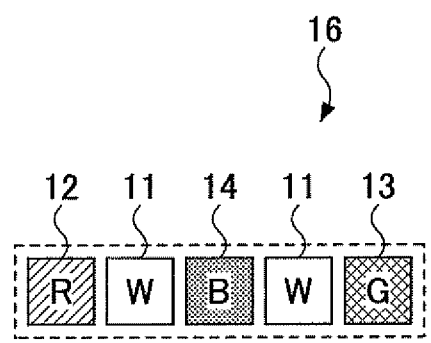
FIG. 8C is a diagram illustrating an arrangement of the light-emitting diodes 16 including white light-emitting diodes 11 and the color light-emitting diodes 15.

FIG. 8C is a diagram illustrating an arrangement of the light-emitting diodes 16 including the white light-emitting diodes 11 and the color light-emitting diodes 15 as a yet another example. FIG. 8C illustrates a case where the two white (W) light-emitting diodes 11, the single red (R) light-emitting diode 12, the single green (G) light-emitting diode 13, and the single blue (B) light-emitting diode 14 make a set.

Figure 8D:
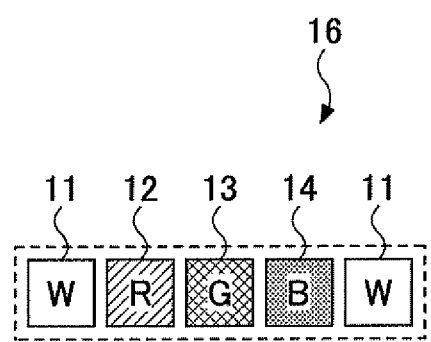
FIG. 8D is a diagram illustrating an arrangement of the light-emitting diodes 16 including the white light-emitting diodes 11 and the color light-emitting diodes 15, different from FIG. 8C.

FIG. 8D is a diagram illustrating an arrangement of the light-emitting diodes 16 including the white light-emitting diodes 11 and the color light-emitting diodes 15, different from FIG. 8C. FIG. 8D illustrates another example of the set of the two white (W) light-emitting diodes 11, the single red (R) light-emitting diode 12, the single green (G) light-emitting diode 13, and the single blue (B) light-emitting diode 14. Combinations of color light-emitting diodes are not limited to the above-described examples.

In FIG. 1 through FIG. 7, a description is given, taking applications of the white light-emitting diodes 11 as examples. All of these can be applied to all of the light-emitting diodes 16 formed of various combinations including the color light-emitting diodes 15 or the white light-emitting diodes 11.

Figure 9:
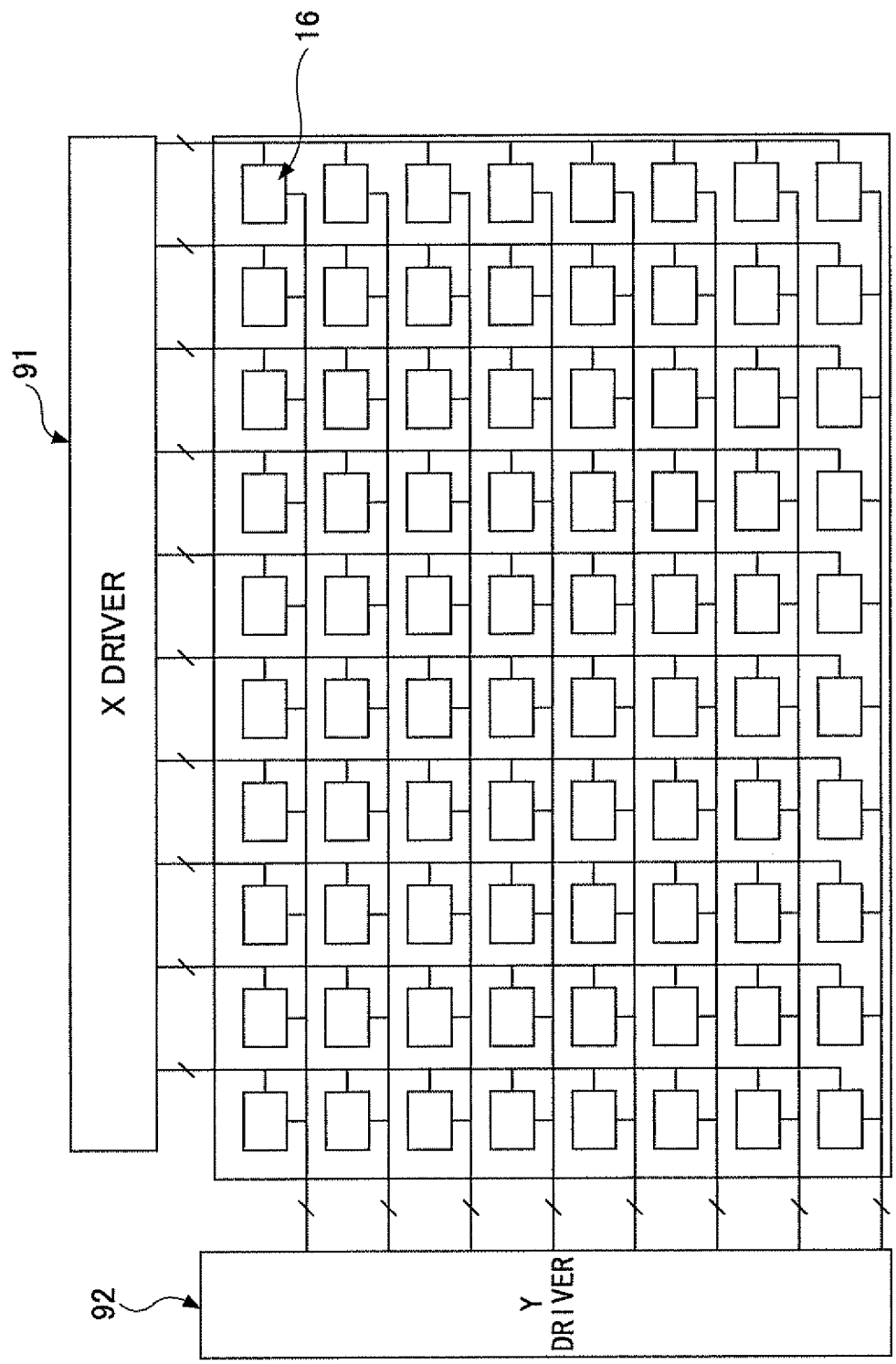
FIG. 9 is a diagram for describing the relationship between the array and the driving of light-emitting diodes in the backlight according to the present invention.

Next, a description is given below of driving the light-emitting diodes 16 of a backlight according to an embodiment to which the present invention is applied. FIG. 9 is a diagram illustrating an embodiment of the method of driving the light-emitting diodes 16. In FIG. 9, an X driver 91 is the horizontal driver circuit of the arrayed multiple light-emitting diodes 16, and a Y driver 92 represents their vertical driver circuit. In this configuration, the individual light-emitting diodes 16 are connected to the X driver 91 and the Y driver 92 independently of one another. Accordingly, it is possible to control light-emitting diodes independently of one another on a one-by-one basis with respect to their brightness. However, if the number of the light-emitting diodes 16 is large as in large liquid crystal display panels, this results in large numbers of output terminals and interconnects of the driver circuits (LSIs) of the light-emitting diodes 16. In order to reduce the numbers of output terminals of the above-described driver circuits, the backlight is divided into several pieces as illustrated in FIG. 7, thereby reducing the number of the light-emitting diodes 16 assigned to a single driver circuit. As a result, it is possible to reduce the numbers of output terminals and interconnects of the driver circuits.

Figure 10:
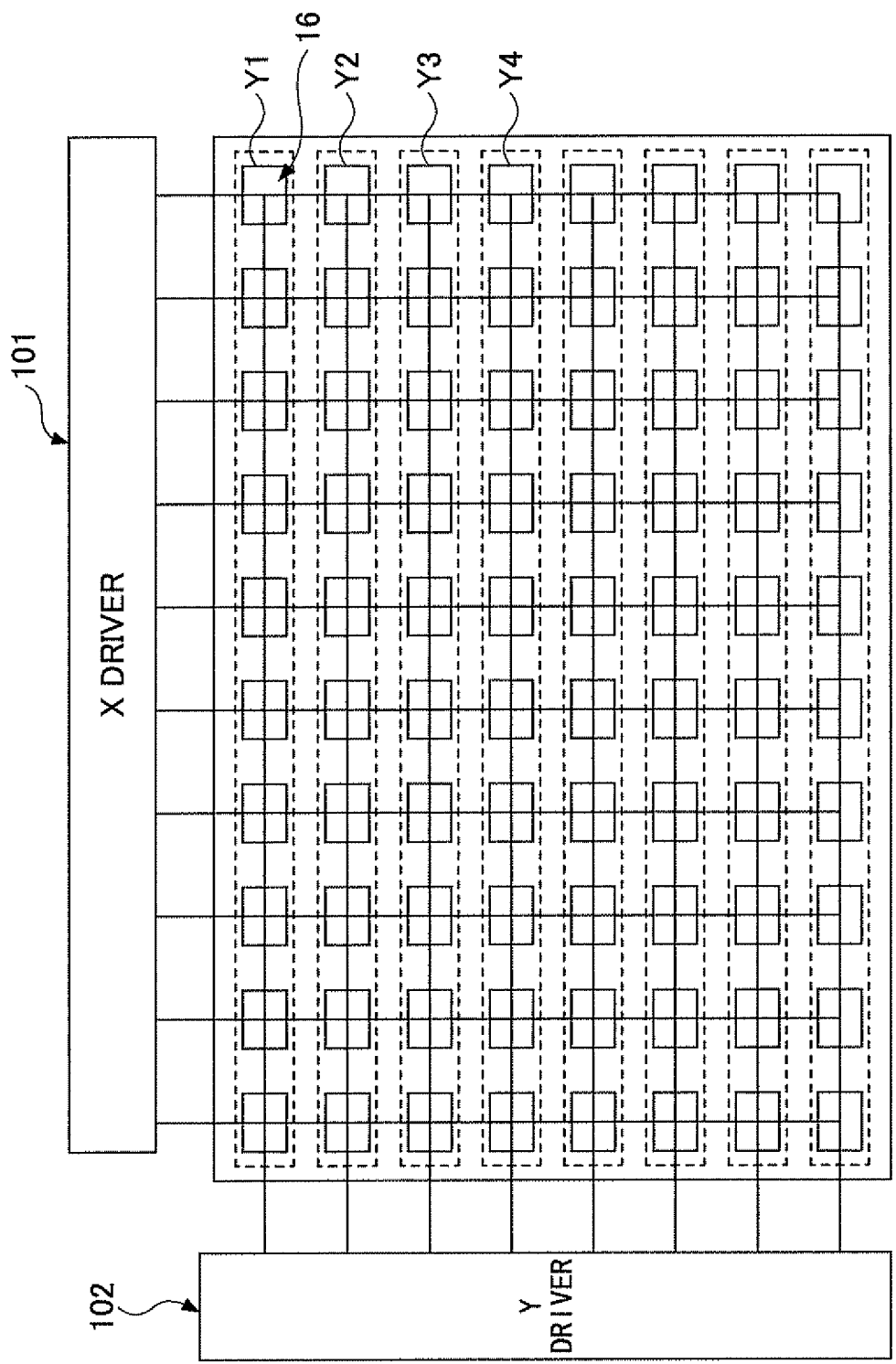
FIG. 10 is a diagram describing a case of driving light-emitting diodes on a line-by-line basis in the backlight according to the present invention.

FIG. 10 is a diagram illustrating another embodiment of driving the light-emitting diodes 16. In FIG. 10, in driving the light-emitting diodes 16, the light-emitting diodes 16 are selected on the basis of individual lines vertically spaced from each other at predetermined intervals and extending horizontally as surrounded by dotted lines, and the light-emitting diodes 16 in the horizontal directions on a selected one of the lines are individually controlled. Specifically, if one of the lines in the vertical directions is turned ON and the other lines are turned OFF by the Y driver 102 in FIG. 10, driving currents for the individual light-emitting diodes 16 arranged in the horizontal directions on the turned-ON line can be changed independently of one another through the X driver 101. That is, in this case, each of the lines extending in the horizontal directions forms the unit, which is the minimum unit of the light-emitting diodes 16.

For example, if first Line Y1 is ON and all of the other lines are OFF in a vertical array, only first Line Y1 is enabled, and the light-emitting diodes 16 on first Line Y1 can be controlled independently of one another with respect to current. Next, second Line Y2 is turned ON and the other lines are turned OFF. In this case, only second Line Y2 is enabled, and the light-emitting diodes 16 on second Line Y2 can be controlled independently of one another. Thereafter, lines are scanned sequentially from top to bottom, like from third Line Y3 to fourth Line Y4, in the same manner. The above-described configuration is advantageous in that the driver circuits and the interconnection of the light-emitting diodes 16 are simplified and that the power consumption is reduced compared with the case of turning on the light-emitting diodes 16 simultaneously because the light-emitting diodes 16 are turned on in sequence.

According to the above-described method, however, in the case of a large number of lines, the duty cycle may become short, so that the light-emitting diodes 16 may be dark, because the light-emitting diodes 16 are turned on by time division driving on a line-by-line basis. For example, if there are a large number of lines because of a large number of the light-emitting diodes 16 as in large liquid crystal panels, there may occur the phenomenon of low luminance of the entire backlight.

Figure 11:
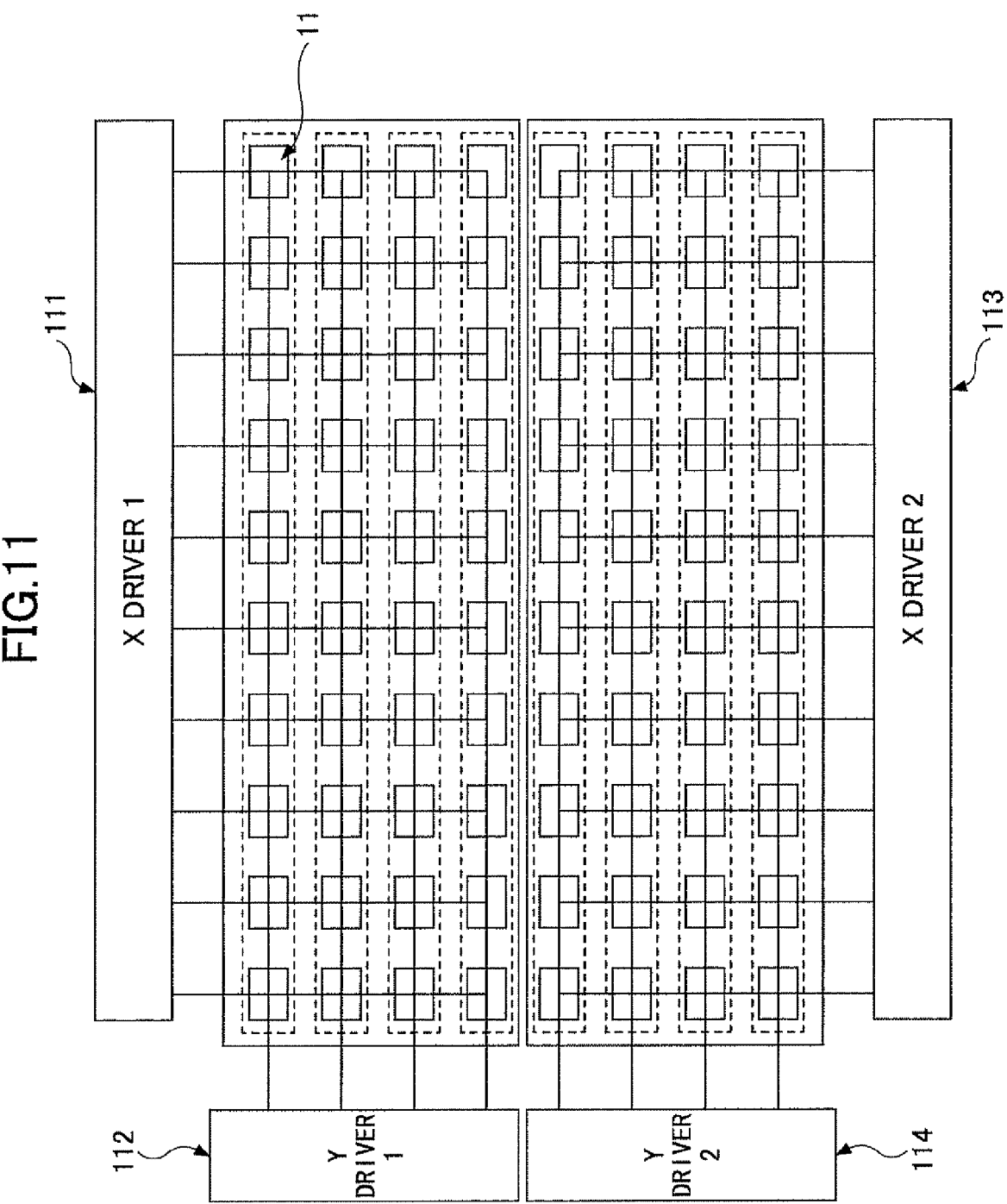
FIG. 11 is a diagram describing another case of driving light-emitting diodes on a line-by-line basis in the backlight according to the present invention.

Therefore, in such a case, all the light-emitting diodes 16 may be divided into blocks, each of which is a group of multiple units, thereby narrowing an area assigned to a single driver circuit. FIG. 11 is a diagram illustrating a backlight subjected to block division according to this embodiment. As illustrated in FIG. 11, a driver circuit is vertically divided into several pieces, so that the divided blocks can be controlled independently of one another. FIG. 11 illustrates the case of vertical division into two pieces. In the drawing, a first divided Y driver 112 and a second divided Y driver 114 are enabled to perform control independently of each other in the vertical direction, and a first divided X driver 111 and a second divided X driver 113 are enabled to perform control independently of each other in the horizontal directions. This makes it possible to substantially reduce the number of lines by half. As a result, the duty cycle of turning on each line is halved, so that the brightness of the light-emitting diodes 16 is doubled. Further, the interconnection of each light-emitting diode 16 is also simplified.

Figure 12A:
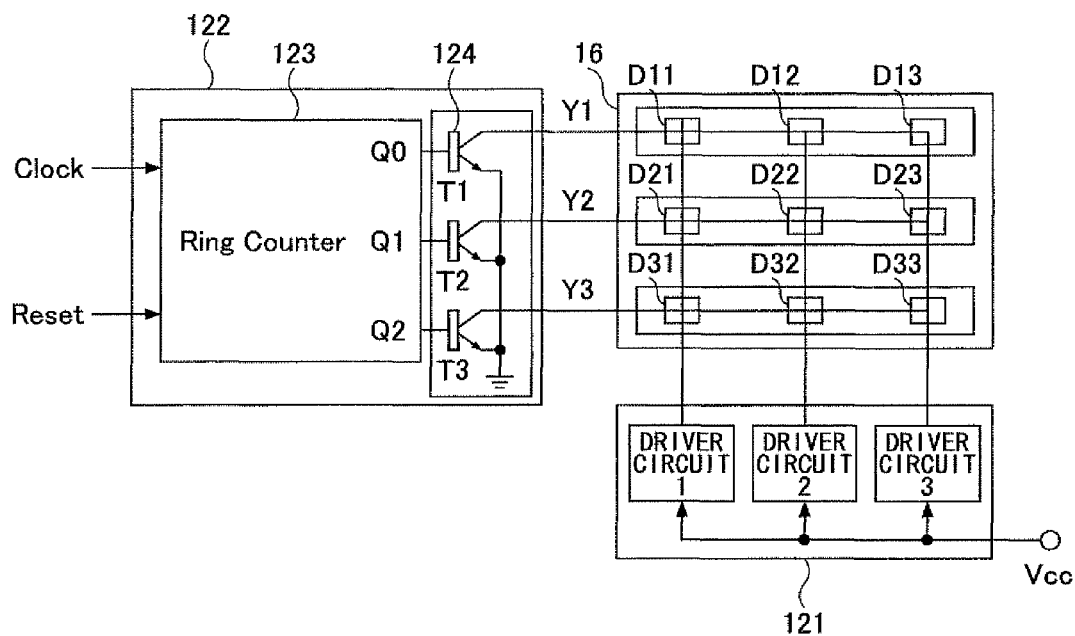
FIG. 12A is a diagram illustrating a configuration of the light-emitting diodes 16 and their driving means of a backlight according to this embodiment.
Figure 12B:
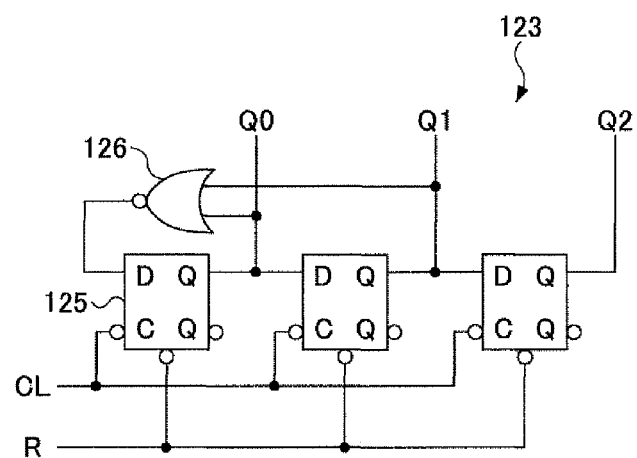
FIG. 12B is a diagram illustrating a circuit of a ring counter 123 illustrated in FIG. 12A.
Figure 12C:
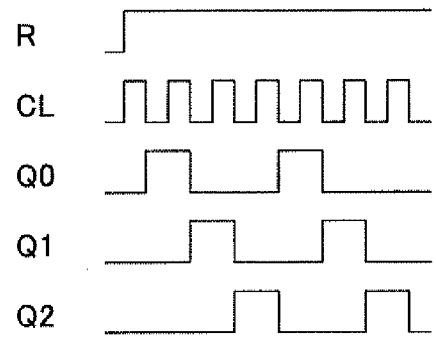
FIG. 12C is a diagram illustrating waveforms and timing of parts of the ring counter 123.

Next, a description is given, using FIG. 12A through FIG. 12C, of an overall operation including a horizontal driver circuit in the case of a line-by-line method according to an embodiment to which the present invention is applied.

FIG. 12A is a diagram illustrating a configuration of the light-emitting diodes 16 and their driving means of a backlight according to this embodiment. In FIG. 12A, the individual light-emitting diodes 16 are expressed using a denotation of Dij (i and j are natural numbers) in order to express their rows and columns. Further, in order to simplify the description, the case where the light-emitting diodes 16 are arranged with three light-emitting diodes 16 on each of three lines as illustrated in FIG. 12A is taken as an example. In this case, it may be considered that the unit, which is the minimum unit of the light-emitting diodes 16, is formed of 3×3=9 light-emitting diodes 16. FIG. 12A illustrates a configuration of the light-emitting diodes 16, a horizontal driver circuit (X driver) 121, and a vertical driver circuit (Y driver) 122 of the backlight unit according to this embodiment. In FIG. 12A, Line Y1, Line Y2, and Line Y3 of the vertical driver circuit Y driver 122 are connected to the cathodes of Light-Emitting Diodes D11, D12, and D13, the cathodes of Light-Emitting Diodes D21, D22, and D23, and the cathodes of Light-Emitting Diodes D31, D32, and D33, respectively. Further, Driver Circuit 1 in the horizontal driver circuit X driver 121 is connected to Light-Emitting Diodes D11, D21, and D31. Likewise, Light-Emitting Diodes D12, D22, and D32 are connected to Driver Circuit 2, and Light-Emitting Diodes D13, D23, and D33 are connected to Driver Circuit 3.

FIG. 12B is a diagram illustrating a circuit of a ring counter 123 illustrated in FIG. 12A. FIG. 12C is a diagram illustrating waveforms and timing of parts of the ring counter 123. As illustrated in FIG. 12C, Q0, Q1, and Q2 are turned ON sequentially by a clock input.

That is, in FIG. 12B, the sequential circuit of the ring counter is formed by D flip-flops 125 and a NOR gate 126. The D flip-flops 125 are flip-flops that change the value of Q to D in response to the clock input changing from 0 to 1, but otherwise keep on retaining the value. In FIG. 12B, since the clock input terminals are low level active terminals, the above-described outputting and storing operations are performed when the clock signal changes from 1 to 0. Letting the initial values of Q0, Q1, and Q2 be 1, 0, and 0, respectively, in FIG. 12B (hereinafter, this state is described as "100"), the outputs periodically change as 010, 001, 100, 010, . . . every time there is a low-level clock input, so that the outputs are as illustrated in FIG. 12C. For example, the Y lines of FIG. 12A are selected by these operations using the ring counter.

When Line Y1 is selected in FIG. 12A, Transistor T1 of a drive amplifier 124 is turned ON, so that all of the cathodes of Light-Emitting Diodes D11, D12, and D13 on Line Y1 are grounded. On the other hand, the anodes of Light-Emitting Diodes D11, D12, and D13 are connected to Driver Circuit 1, Driver Circuit 2, and Driver Circuit 3, respectively, so that the Driver Circuits can control currents supplied to Light-Emitting Diodes D11, D12, and D13 independently of one another. Accordingly, Light-Emitting Diodes D11, D12, and D13 on Line Y1 can be controlled independently of one another with respect to brightness. By sequentially selecting Lines Y2 and Y3 in the same manner thereafter, it is possible to control the brightness of the backlight on a line-by-line basis in the vertical directions and on a light-emitting diode basis in the horizontal directions. Further, constant current circuits or pulse width modulation circuits PWM (Pulse Width Modulation) are commonly used for Driver Circuit 1, Driver Circuit 2, and Driver Circuit 3. The present invention is not limited to the above-described circuits.

Next, a description is given, using FIG. 13A through FIG. 13D, of a method of sequentially turning on odd-numbered lines first and then sequentially turning on even-numbered lines as another embodiment of sequentially turning on the light-emitting diodes 16 line by line.

Figure 13A:
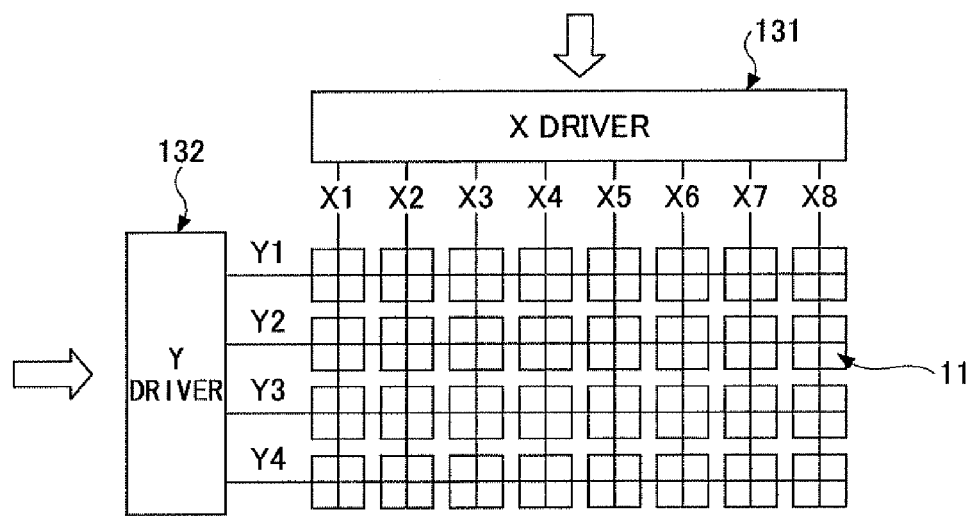
FIG. 13A is a diagram illustrating a configuration of the light-emitting diodes 16 and their driving means of a backlight according to this embodiment.

FIG. 13A is a diagram illustrating a configuration of the light-emitting diodes 16 and its driving means of a backlight according to this embodiment. In order to simplify description, the case where light-emitting diodes 16 are arranged with eight light-emitting diodes 16 in the horizontal directions and four light-emitting diodes 16 in the vertical directions as illustrated in FIG. 13A is taken as an example. It may be considered that this is the case where the unit, which is the minimum unit of the light-emitting diodes 16, is 8×4=32. FIG. 13A is a diagram illustrating the relationship between the 8×4 light-emitting diodes 16 and a horizontal X driver 131 and a vertical Y driver 132 for driving the light-emitting diodes 16. In the drawing, in the vertical directions, odd-numbered Lines Y1 and Y3 are sequentially turned on first and thereafter even-numbered Lines Y2 and Y4 are sequentially turned on.

Figure 13B:
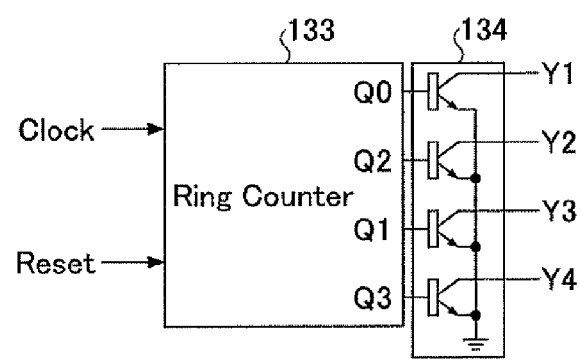
FIG. 13B is a diagram illustrating an internal configuration of a Y driver 132.
Figure 13C:
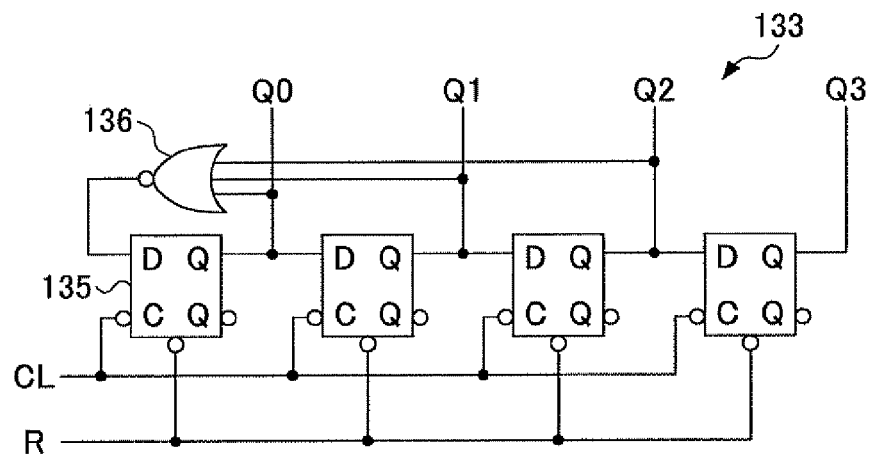
FIG. 13C is a diagram illustrating a four-stage ring counter circuit 133.

A description is given, using FIG. 13B and FIG. 13C, of a specific embodiment of a method of sequentially selecting lines in the vertical directions. FIG. 13B is a diagram illustrating an internal configuration of the Y driver 132. In FIG. 13B, the Y driver 132 includes a ring counter circuit 133 and a drive amplifier 134.

FIG. 13C is a diagram illustrating the four-stage ring counter circuit 133. The ring counter circuit 133 in FIG. 13C includes four D flip-flops 135 and a single NOR gate 136. Compared with the ring counter circuit 123 of FIG. 12B, the ring counter circuit 133 of FIG. 13C is merely increased in the number of stages of the D flip-flops 135 by one, and its operation is the same as described in FIG. 12B. Accordingly, its description is omitted.

Figure 13D:
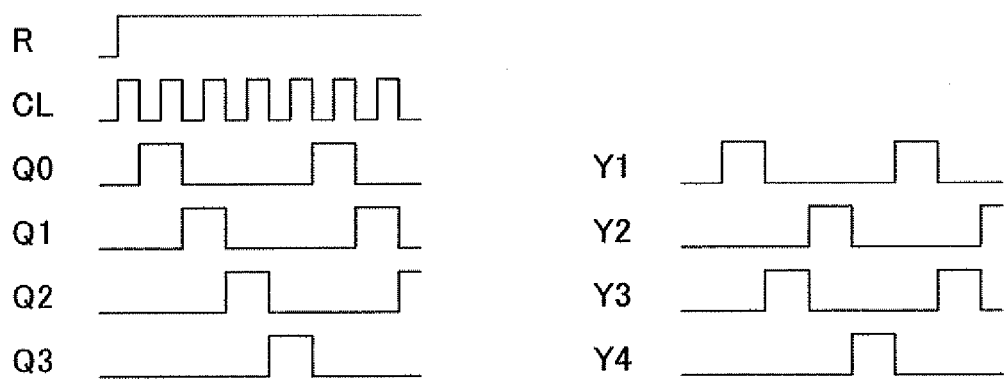
FIG. 13D is a timing chart illustrating an operation of the ring counter circuit 133.

FIG. 13D is a timing chart illustrating an operation of the ring counter circuit 133. The ring counter circuit 133 operates like the waveforms and timing illustrated in FIG. 13D. By connecting the outputs of the ring counter 133 to the respective lines through the drive amplifier 134 as in the circuit of FIG. 13B, the lines are driven with the timing illustrated on the right in FIG. 13D, so that the lines are sequentially turned on, first odd-numbered lines and then even-numbered lines, as in interlaced scanning in television. The present invention does not limit the method of sequentially selecting lines to the ring counters 123 and 133.

Compared with the case of turning on lines sequentially from top to bottom, the method of turning on first odd-numbered lines and then even-numbered lines as described above, although turning on every other line, can turn on the entire display screen from top to bottom twice as fast. Accordingly, it is possible to reduce the repeating frequency of turning on light-emitting diodes.

Figure 14:
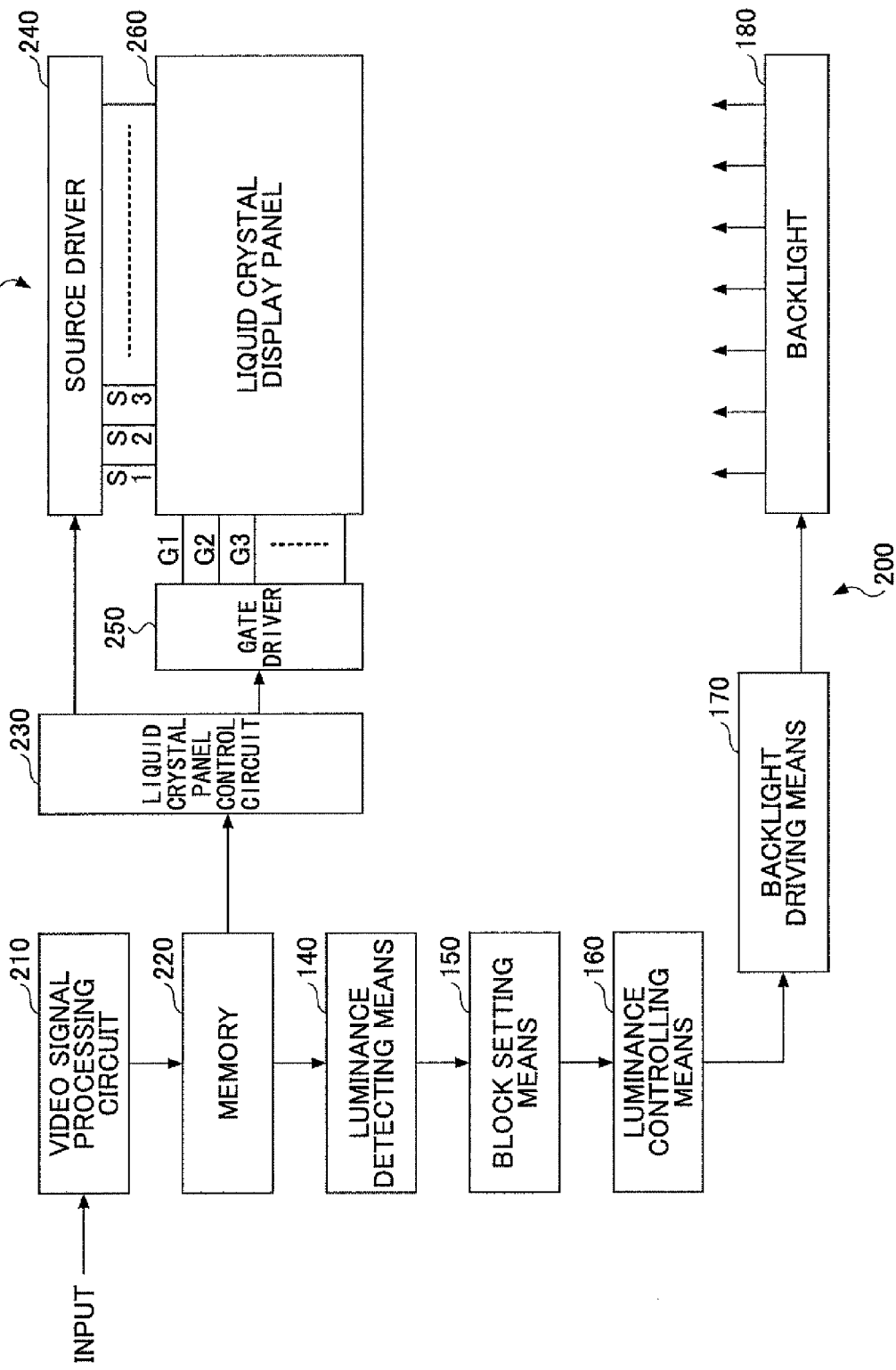
FIG. 14 is a diagram illustrating an example of the overall configuration of a backlight according to this embodiment and a liquid crystal display unit using the same.

Next, based on the individual operations described so far, a description is given, using FIG. 14, of the overall configuration of a backlight according to an embodiment to which the present invention is applied. FIG. 14 is a diagram illustrating an example of the overall configuration of a backlight according to this embodiment and a liquid crystal display unit using the same.

In FIG. 14, a backlight 200 according to this embodiment includes luminance detecting means 140, block setting means 150, luminance controlling means 160, backlight driving means 170, and a backlight board 180. Further, a liquid crystal display unit 300 to which the backlight 200 according to this embodiment is applied includes a video signal processing circuit 210, a memory 220, a liquid crystal panel control circuit 230, a source driver 240, a gate driver 250, and a liquid crystal display panel 260.

First, a description is given of the liquid crystal display unit 300. The video signal processing circuit 210 is a circuit that performs processing necessary for displaying images of a video signal when the video signal is input. The memory 220 is storage means for temporarily storing the processed video signal. The liquid crystal panel control circuit 230 is a circuit for controlling the image display of the liquid crystal display panel 260, and as direct operations, controls the driving of the source driver 240 and the gate driver 250 to control the timing of horizontal synchronization and vertical synchronization, for example. The source driver 240 is a driving IC (Integrated Circuit) for driving the sources of thin-film transistors forming the pixels of the liquid crystal display panel 260, and supplies data signals to the sources. Further, the gate driver 250 is a driving IC for driving the gates of the thin-film transistors, and supplies address signals (sequential scanning signals) to the gates. The liquid crystal display panel 260 is means for displaying images of the input video on a display screen, and is placed to face the front of the backlight unit 200. The liquid crystal display panel 260 is driven by the source driver 240 and the gate driver 250, and display images by being illuminated from the back by the backlight 200.

Next, a description is given of the backlight 200 according to this embodiment. The video signal input to the video signal processing circuit 210 is input to the luminance detecting means 140 through the memory 220. The luminance detecting means 140 is means for detecting, analyzing, and determining the luminance of the video signal. For example, the luminance detecting means 140 detects a luminance distribution, etc., in the video signal by using a luminance histogram and average luminance.

Figure 15:
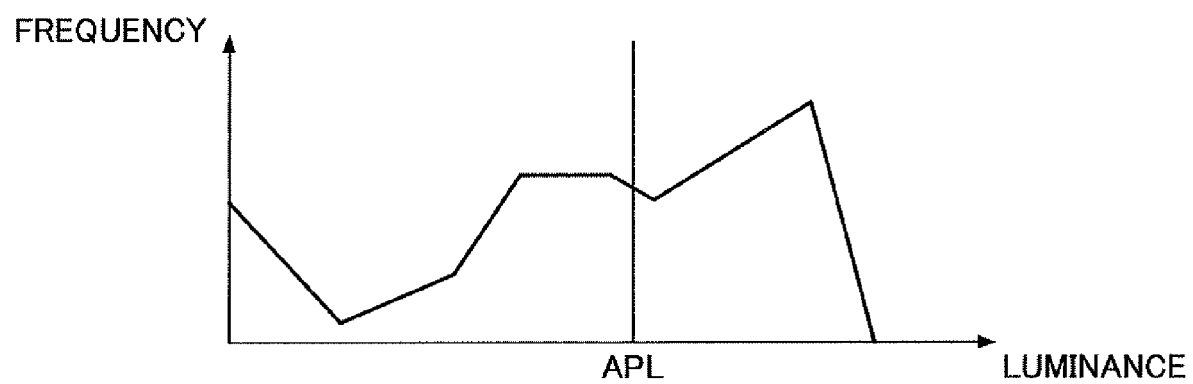
FIG. 15 is a diagram illustrating a luminance histogram and average luminance.

FIG. 15 is a diagram illustrating a luminance histogram and average luminance detected in the luminance detecting means 140. In FIG. 15, the horizontal axis indicates luminance $[cd/m^2]$ and the vertical axis indicates frequency. Further, average luminance APL is indicated in the same manner. For example, a bright video shows the characteristic of high frequency in a high luminance region, and a dark video shows the characteristic of high frequency in a low luminance region on the left side. If this is calculated on, for example, a predetermined unit basis, it is possible to determine the luminance distribution or luminance average APL of the unit. The luminance detecting means 140 detects the luminance of the video signal with such a technique. Various techniques for detecting luminance may be applied as long as the techniques can determine luminance in the video signal.

Returning to FIG. 14, the block setting means 150 determines block size and a combination pattern based on the luminance information detected in the luminance detecting means 140, and controls switching for a block change. For example, when the luminance of a video in a certain region is low compared with its surroundings based on the luminance information detected in the luminance detecting means 140, the block setting means 150 performs an operation to group the units of the light-emitting diodes 16 included in the low luminance region into a block. For example, when the luminance of the video signal for each unit or corresponding to each pixel is detected, the difference in luminance may be calculated between adjacent units, and an operation may be performed to group units whose difference in luminance is less than or equal to a predetermined value. The block setting means 150 may be configured as a microcomputer that includes a predetermined electronic circuit capable of performing such operations, a CPU (Central Processing Unit), a RAM (Random Access Memory), and a ROM (Read Only Memory) and is caused to operate by a program.

Further, the block setting means 150 may also set division regions and perform blocking based on the proportion of a large area part or the amount of high-frequency components in the video signal. For example, if an object of display is so large as to form a large area part and its proportion is high in the video signal, blocking may be performed to form a large block so as to include the large area part, so that the luminance of a region formed into the block can be suitably controlled in accordance with the luminance of the object of display. Further, if there is a region including a lot of high-frequency components in the video signal, it is considered that the region is to be displayed in a dazzling state or to have much noise. Accordingly, such blocking as to make it possible to reduce luminance may be performed by forming the region including a lot of high-frequency components into a block. Further, these determinations based on the proportion of a large area part and the amount of high-frequency components in the video signal may be performed in combination.

After performing an operation for such block setting, the block setting means 150 performs a switch switching operation for switching connections so that the backlight driving means operates as a predetermined block. A description is given below of this point.

The luminance controlling means 160 is means for performing luminance control on the blocks determined by the block setting means 150 independently of each other. The luminance control means 160 performs control to drive each block with suitable luminance based on the luminance information including the luminance distribution detected in the luminance detecting means 140 and on information on the blocking set by the block setting means 150. That is, the luminance control means 160 controls a block in a low luminance region of the video signal in such a manner as to drive the light-emitting diodes 16 with low luminance in order to save power, and controls a block included in a high luminance region of the video signal in such a manner as to drive the light-emitting diodes 16 with high luminance. For example, the luminance of the light-emitting diodes 16 may be controlled with supplied current if the driver circuits included in the backlight driving means are constant current circuits and by controlling a duty ratio if the driver circuits are pulse width modulation (PWM) circuits.

Further, as described above, in the case of blocking performed based on the proportion of a large area part in the video signal, the luminance control means 160 may control luminance based on the luminance of the video signal of an object of display in a region formed into a block so that the object of display is suitably displayed. Further, in the case of blocking performed based on the amount of high-frequency components, for example, if there are a lot of high-frequency components, the luminance control means 160 may perform reductive control by lowering luminance to prevent dazzle or noise. On the other hand, if there are few high-frequency components, the luminance control means 160 may control the luminance of the light-emitting diodes 16 in accordance with the luminance of a regular video. These controls may be combined. For example, if the luminance of an object of display occupying a large area is high, basically, the light-emitting diodes 16 are controlled to be high in luminance accordingly. However, if a lot of high-frequency components are detected at the same time, it is highly likely that viewers feel dazzled with the luminance as is. Accordingly, corrective control can be performed to slightly reduce the luminance. Thus, the luminance control means 160 can perform suitable control on a region formed into a block with variety in accordance with the contents of the video signal.

The backlight driving means 170 is means for driving the light-emitting diodes 16 arranged on the backlight board 180 and causing the light-emitting diodes 16 to emit light, and includes an X driver, a Y driver, etc. The backlight driving means 170 includes driver circuits for driving units, which are the minimum units of the light-emitting diodes 16, and is configured to allow them to be joined to their surrounding units to form a large block. A description is given below of this point.

The backlight board 180, which has the light-emitting diodes 16 provided on its surface, is means for emitting light onto the back of the liquid crystal display panel 180 with the light-emitting diodes 16. Accordingly, the backlight board 180 serves to support the light-emitting diodes 16 and to determine their arrangement.

Next, a description is given, using FIG. 16 through FIG. 19, of an operation in the case of block switching by the backlight driving means 170 in the backlight 200 having such an overall configuration.

Figure 16:
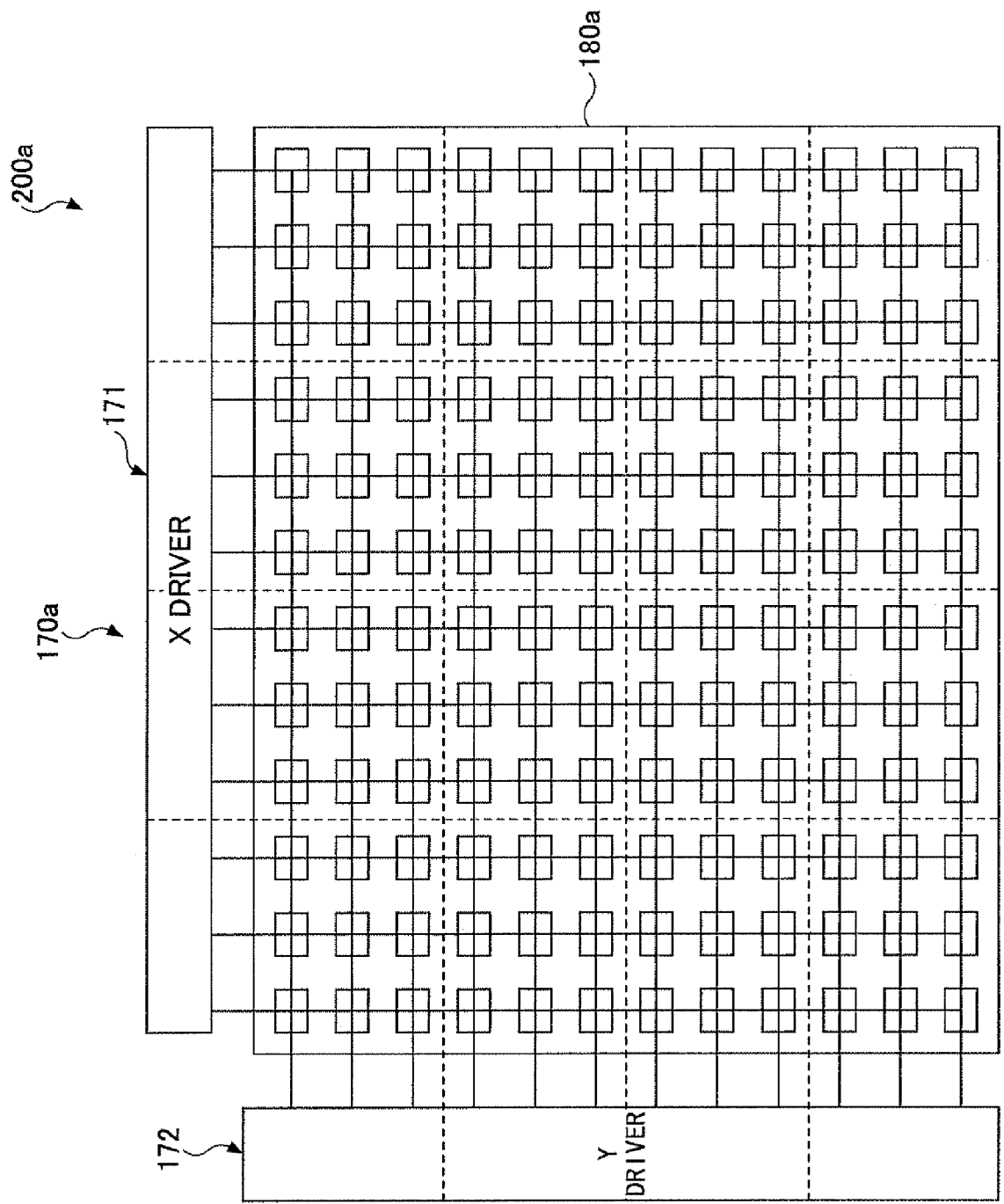
FIG. 16 is a diagram illustrating a configuration of a backlight board 180 and backlight driving means 170.

FIG. 16 is a diagram illustrating a configuration of a backlight board 180a and backlight driving means 170a of a backlight 200a according to this embodiment. In FIG. 16, the unit, which is the minimum unit of the light-emitting diodes 16, is formed of 3×3=9 light-emitting diodes 16. Further, the 4×4=16 units are provided on the backlight board 180a. Further, an X driver 171 and a Y driver 172 that drive the light-emitting diodes 16 are provided. Hereinafter, a description is given, taking the backlight 200a having the backlight board 180a having such a unit configuration as an example.

Figure 17:
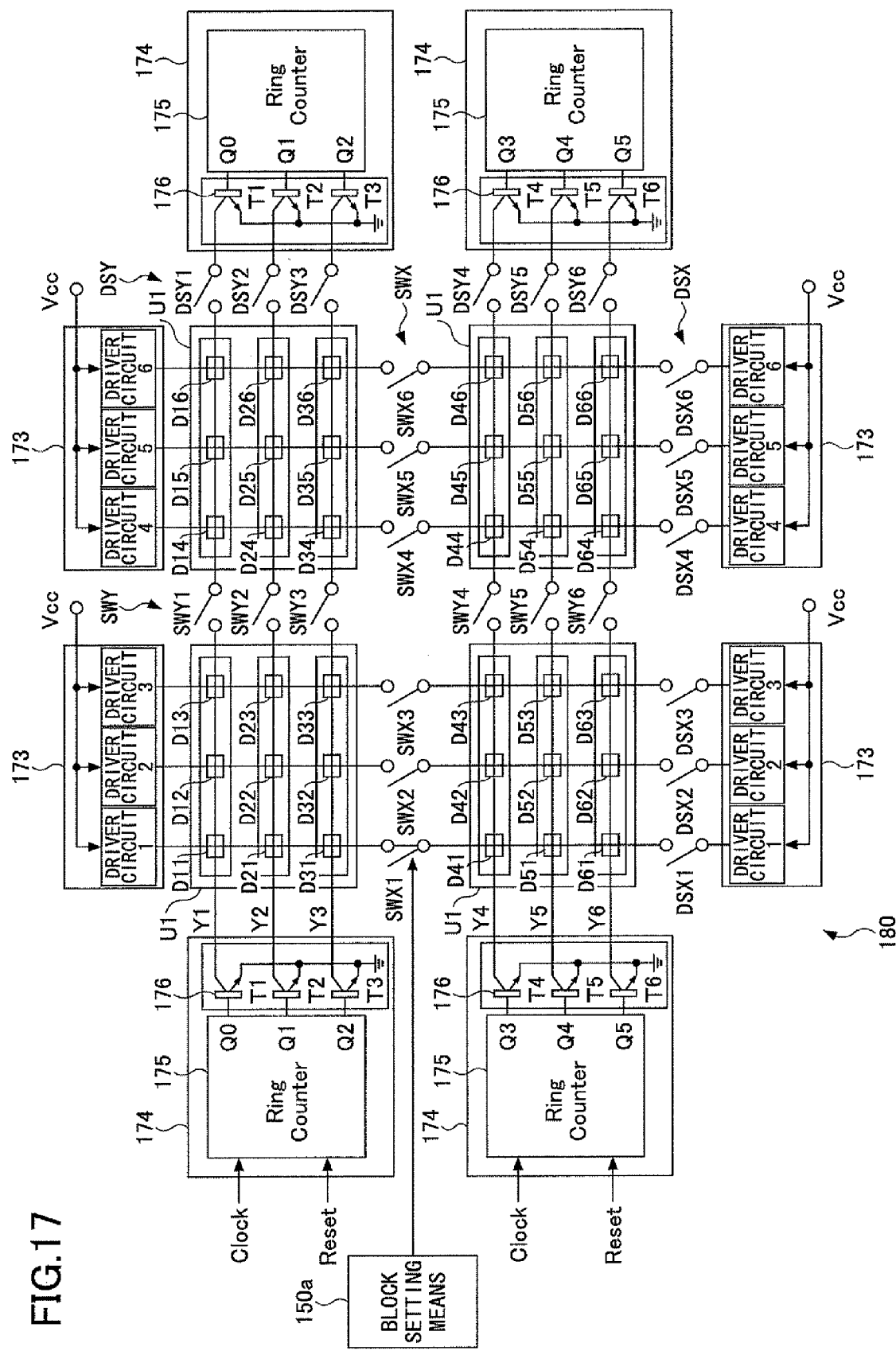

FIG. 17 is a diagram illustrating the backlight 200a illustrated in FIG. 16 where the units each including 3×3=9 light-emitting diodes 16, which is a minimum unit, are adjacently arranged 2×2 on the backlight board 180a. In FIG. 17, Units U1 through U4 are arranged in two rows and two columns on the backlight board 180a of the backlight 200a according to this embodiment, an X driver unit 173 and a Y driver unit 174 are provided for each of Units U1 through U4. Further, the backlight 200a includes three Interunit Switches SWXs or SWYs between every adjacent two of Units U1 through U4, that is, 3×4=12 Interunit Switches SWXs and SWYs in total. Interunit Switches SWXs and SWYs can perform switching between the connection and the disconnection of adjacent Units U1 through U4. Further, the backlight 200a includes six X Driver Connecting Switches DSXs that establish connection to Driver Circuits 1 through 6 in the X columns, and also includes six Y Driver Connecting Switches DSYs that establish connection to Transistors T1 through T6 in the Y rows. Further, the backlight 200a includes block setting means 150a that controls these Switches SWXs, SWYs, DSXs, and DSYs.

In FIG. 17, the configurations and operations of the X driver units 173 and the Y driver units 174 are the same as those of the horizontal driver circuit 121 and the vertical driver circuit 122 described in FIG. 12A. Accordingly, their description is omitted. First Unit U1 is connected to the X driver unit 173 and the Y driver unit from the initial state, and second Unit U2 can be controlled separately by closing and turning ON Y Driver Connecting Switches DSY1 through DSY3. Likewise, third Unit U3 is separately connected to both the X driver unit 173 and the Y driver unit 174 by turning ON X Driver Connecting Switches DSX1 through DSX3. Further, fourth Unit U4 is connected to the X driver unit 173 and the Y driver unit 174 by turning ON X Driver Connecting Switches DSX4 through DSX6 and Y Driver Connecting Switches DSY4 through DSY6, so as to be separately controllable. Thus, the backlight 200a according to the embodiment of FIG. 17 can drive Units U1 through U4 independently of one another with the driver circuits that drive Units U1 through U4. When it is desired to drive the light-emitting diodes 16 on the basis of individual Units U1 through U4, which are minimum units, all of X Driver Connecting Switches DSX1 through DSX6 and all of Y Driver Connecting Switches DSY1 through DSY6 are turned ON, and all of Interunit Switches SWXs and SWYs are turned OFF, thereby making it possible to drive each light-emitting diode 16 in such a state. Such switching of switches may be performed in the block setting means 150a.

On the other hand, when it is desired to group units and drive the light-emitting diodes 16 on a block-by-block basis, such control may be performed that Interunit Switches SWXs or SWYs for units desired to be grouped may be turned ON; and if the X driver units 173 or the Y driver units 174 are redundant in an X column or a Y row subjected to grouping, Driver Connecting Switches DSXs or DSYs are turned OFF so that there is one X driver unit 173 or one Y driver unit 174 for each of the X columns or the Y rows of blocks.

For example, when it is desired to group first Unit U1 and second Unit U2 into a block, Interunit switches SWY1 through SWY3 may be turned ON and Driver Connecting Switches DSY1 through DSY3 may be turned OFF. At this point, if such switching is simultaneously performed as to also group third Unit U3 and fourth Unit U4 into a block, this results in division into two, upper and lower, blocks. Further, for example, when it is desired to group first Unit U1 and third Unit U3 into a block, switching may be performed to turn ON Interunit Switches SWX1 through SWX3 and turn OFF Driver Connecting Switches DSX1 through DSX3. At this point, if such switching is performed as to group second Unit U2 and fourth Unit U4 into a block, the whole is divided into two, right and left, blocks. Such switching of Switches SWXs, SWYs, DSXs, and DSYs may be performed under the control of the block setting means 150a.

Thus, according to the backlight 200a according to this embodiment, by controlling the switching of Switches SWXs, SWYs, DSXs, and DSYs, it is possible to control Units U1 through U4 individually or to group adjacent Units U1 through U4 into blocks and control the blocks independently of each other, and it is possible to group Units U1 through U4 into blocks in accordance with the contents of the video signal, for example, the luminance of the video signal, and to perform control on a block-by-block basis.

Either switching elements of MOS (Metal Oxide Semiconductor) transistor semiconductors or switches such as relays may be used for Switches SWXs, SWYs, DSXs, and DSYs. Suitable switches SWXs, SWYs, DSXs, and DSYs may be employed in accordance with use so as to facilitate control in the block setting means 150a.

Further, in FIG. 17, a description is given, citing a simple example of 2×2 in order to facilitate explanation. However, the same can be applied even with an increase in the number of Units U1 through U4.

Figure 18:
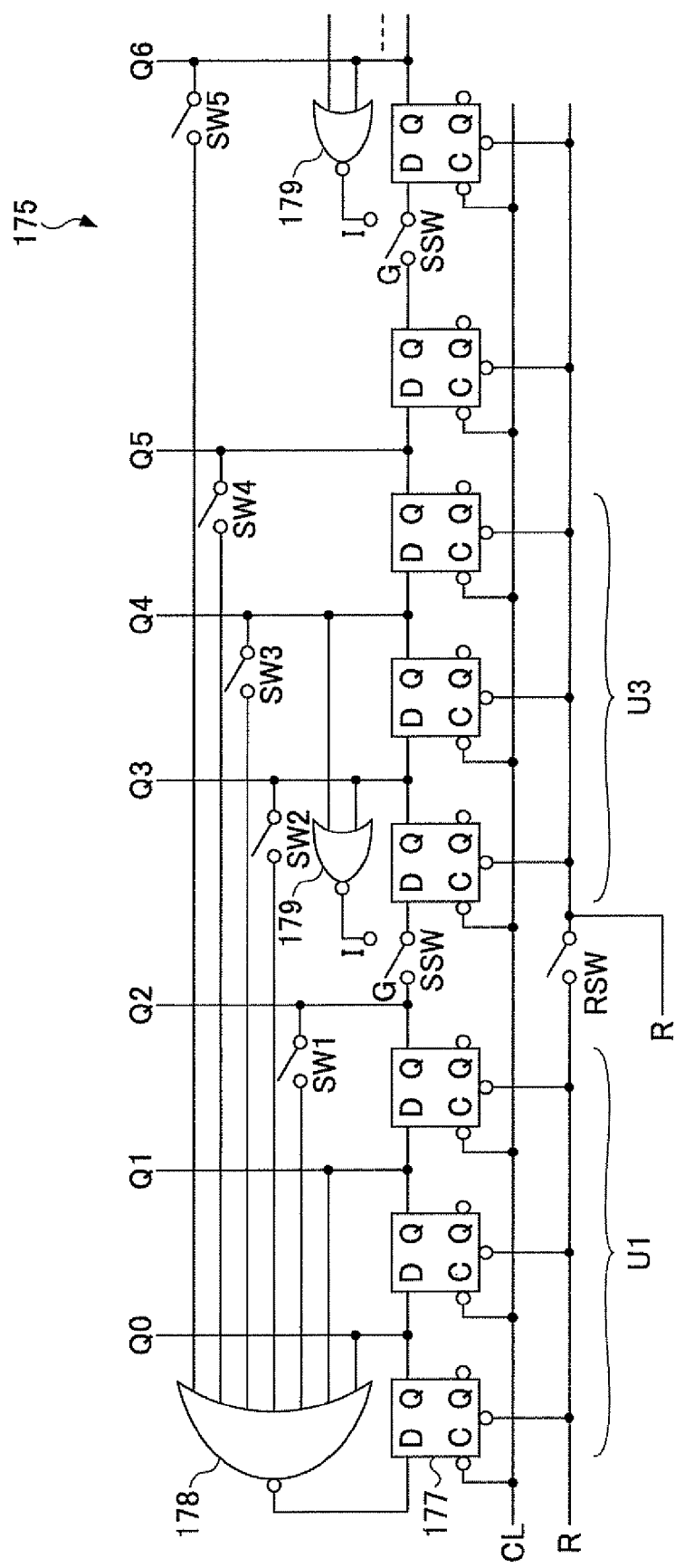
FIG. 18 is a diagram illustrating a configuration of ring counter circuits 175.

Next, a description is given, using FIG. 18, of an operation and configuration of the ring counter circuits 175 in the case of grouping Units U1 through U4 into blocks in the directions of X columns in FIG. 17. FIG. 18 is a diagram illustrating a configuration of the ring counter circuits 175 of the backlight 200a according to this embodiment.

In FIG. 18, the ring counter circuit 175 includes D flip-flops 177, an overall NOR gate 178, and individual NOR gates 179. In FIG. 18, Output Terminals Q0 through Q2 form a single unit and Output Terminals Q3 through Q5 form a single unit. Likewise, Output Terminals Q6 through Q8 also form a single unit, but only Q6 is shown because of space limitations. Output Terminals Q2 through Q6 are provided with Switches SW1 through SW5 that perform switching between the connection and the disconnection of input to the overall NOR gate 179. Further, Selector Switch SSW is provided between every adjacent units. Selector Switch SSW can choose between an terminal that separates and makes independent each unit and a G terminal that connects units into a group. Further, Reset Switch RSW is provided so as to allow a reset signal to be input to each unit.

In the ring counter circuit 175 of such a configuration, in the case of separately driving the light-emitting diodes 16 in each unit, Selector Switches SSWs may be connected to the I terminal side and all of Switches SW1 through SW5 may be turned OFF. As a result, each unit is separated, so that with respect to the inputs of Output Terminals Q1 through Q6, the outputs of Output Terminals Q0 and Q1 are input to only the overall NOR gate 178, and the outputs of Output Terminals Q3 and Q4 and Output Terminals Q6 and Q7 are input to only the individual NOR gates 179 of the respective units. As a result, the sequential circuit recurs among units, and an output "1" recurs and repeats in each individual unit.

Next, for an easier understanding, it is assumed, for example, that Output Terminals Q0 through Q2 are the ring counter 175 in the Y driver unit 174 for first Unit U1 and Output Terminals Q3 through Q5 are the ring counter 175 in the Y driver unit 174 for third Unit U3. Here, Selector Switches SSWs are connected to the G terminal side to turn ON Switches SW1 through SW4. As a result, first Unit U1 and third Unit U3 are connected to be grouped as one. That is, a common clock input is input to the D flip-flops 177 of first Unit U1 and the D flip-flops 177 of third Unit U3. Further, the individual NOR gate 179 is not connected, so that all of Output Terminals Q0 through Q5 are input to the overall NOR gate 178. As a result, Output Terminals Q0 through Q5 form a large loop, in which sequential outputting of "1" recurs and repeats.

Figure 19:
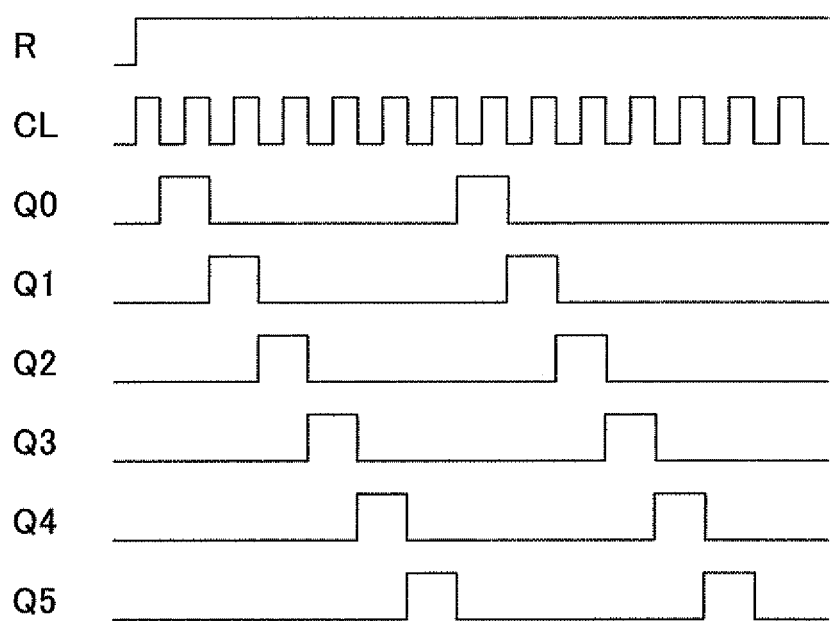
FIG. 19 is a timing chart illustrating an operation of the ring counter circuit 175.

FIG. 19 is a timing chart illustrating an operation of the ring counter circuit 175 of FIG. 18. As illustrated in FIG. 19, an output of "1" shifts sequentially from Output Terminal Q0 to Output Terminal Q5, and when "1" is output from Output Terminal Q5, the sequential shift returns to Output Terminal Q0 and repeats. Thus, by switching Switches SSWs and SW1 through SW4, it is possible to block the outputs of the sequential circuit.

Returning to FIG. 18, the switching of Switches SSWs and SW1 through SW4 may be performed simultaneously with the switching of Switches SWXs and DSXs by the switch setting means 150a illustrated in FIG. 17. As a result, not only electrical connection but also sequential scanning can be blocked.

In FIG. 18, Reset Switch RSW is necessary in the case of also controlling reset pulses individually among Units U1 through U4, but may not be provided if it is not necessary to go so far as to individualize reset pulses. Further, in FIG. 18 as well, a description is given, using Units U1 and U3, for an easier explanation and understanding. Needless to say, however, a larger number of units can be subjected to blocking.

Thus, according to the backlight 200a according to this embodiment, with respect to units each formed of a minimum unit, adjacent units are grouped into a block, and luminance is controlled on a block-by-block basis. As a result, it is possible to perform luminance control suitably in accordance with the contents of a video signal. As a result, it is possible to reduce luminance to reduce power consumption in a dark block of the video signal, and to display a high-quality image by increasing luminance in a high luminance block.

What is described in FIG. 17 through FIG. 19 is a mere example, and blocking may be realized by other means.

Preferred embodiments of the present invention are described in detail above. The present invention, however, is not limited to the above-described embodiments, and variations and replacements may be added to the above-described embodiments without departing from the scope of the present invention.

INDUSTRIAL APPLICABILITY

The present invention is applicable to a backlight that illuminates a liquid crystal panel from its back, and to an image display unit such as a liquid crystal display that uses the same.

The present international application claims priority based on Japanese Patent Application No. 2007-294081, filed on Nov. 13, 2007 and Japanese Patent Application No. 2008-270220, filed on Oct. 20, 2008, the entire contents of No. 2007-294081 and No. 2008-270220 are incorporated herein into the present international application by reference.

The invention claimed is:

1. A backlight using a plurality of light-emitting diodes as a light source and illuminating a liquid crystal display panel from a back thereof, the light-emitting diodes being formed of units, the units each being a minimum unit of m×n where m and n are natural numbers, the backlight comprising:
   a driving part configured to drive the light-emitting diodes on a unit-by-unit basis;
   a block setting part configured to group two or more of the units into a block;
   a luminance controlling part configured to control a luminance of the light-emitting diodes of the block independently on a block-by-block basis; and
   a sequential circuit connected to the units and configured to output a signal that sequentially selects lines of the light-emitting diodes with respect to each of the units,
   wherein the block setting part is configured to change a number of the units grouped into the block by controlling an operation of a first switch connected between the units and to control an operation of a second switch connected between an output terminal connected to a first one of the units and an input terminal connected to a second one of the units in the sequential circuit in changing the number of the units grouped into the block.

2. The backlight as claimed in claim 1, wherein the block setting part is configured to set the number of the units grouped into the block based on a content of a video signal.

3. The backlight as claimed in claim 2, further comprising:
   a luminance detecting part configured to detect a luminance of the video signal,
   wherein the block setting part is configured to set the number of the units grouped into the block based on the luminance of the video signal detected by the luminance detecting part, and the luminance controlling part is configured to control the luminance of the light-emitting diodes on the block-by-block basis.

4. The backlight as claimed in claim 3, wherein the light-emitting diodes include at least one of a white light-emitting diode, a red light-emitting diode, a green light-emitting diode, and a blue light-emitting diode.

5. A liquid crystal display unit, comprising:
   the backlight as set forth in claim 1;
   a liquid crystal display panel placed to face a front of the backlight and configured to display an image by being illuminated from a back thereof by the backlight;
   a source driver and a gate driver configured to drive the liquid crystal display panel; and
   a liquid crystal panel control circuit configured to control driving of the source driver and the gate driver.

6. A backlight using a plurality of light-emitting diodes as a light source and illuminating a liquid crystal display panel from a back thereof, the light-emitting diodes being formed of units, the units each being a minimum unit of m×n where m and n are natural numbers, the backlight comprising:
   a driving part configured to drive the light-emitting diodes on a unit-by-unit basis;
   a block setting part configured to group two or more of the units into a block;
   a luminance controlling part configured to control a luminance of the light-emitting diodes of the block independently on a block-by-block basis; and
   a sequential circuit connected to the units and configured to output a signal that sequentially selects lines of the light-emitting diodes with respect to each of the units, wherein the block setting part is configured to change a number of the units grouped into the block based on a content of a video signal and to control an operation of a switch connected between an output terminal connected to a first one of the units and an input terminal connected to a second one of the units in the sequential circuit in changing the number of the units grouped into the block.

7. The backlight as claimed in claim 6, further comprising:
a luminance detecting part configured to detect a luminance of the video signal,
wherein the block setting part is configured to set the number of the units grouped into the block based on the luminance of the video signal detected by the luminance detecting part, and the luminance controlling part is configured to control the luminance of the light-emitting diodes on the block-by-block basis.

8. The backlight as claimed in claim 7, wherein the light-emitting diodes include at least one of a white light-emitting diode, a red light-emitting diode, a green light-emitting diode, and a blue light-emitting diode.

9. A liquid crystal display unit, comprising:
the backlight as set forth in claim 6;
a liquid crystal display panel placed to face a front of the backlight and configured to display an image by being illuminated from a back thereof by the backlight;
a source driver and a gate driver configured to drive the liquid crystal display panel; and
a liquid crystal panel control circuit configured to control driving of the source driver and the gate driver.

* * * * *